(12) United States Patent
Wang et al.

(10) Patent No.: US 6,898,727 B1
(45) Date of Patent: May 24, 2005

(54) METHOD AND APPARATUS FOR PROVIDING HOST RESOURCES FOR AN ELECTRONIC COMMERCE SITE

(75) Inventors: Yao Wang, Shrewsbury, MA (US); Mohamed Chehadeh, Watertown, MA (US); Quang Vu, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/533,025

(22) Filed: Mar. 22, 2000

(51) Int. Cl.[7] ............................................... G06F 11/00
(52) U.S. Cl. ................................. 714/4; 714/6; 714/7
(58) Field of Search ........................... 714/4, 6, 10, 15, 714/24, 47, 7

(56) References Cited

U.S. PATENT DOCUMENTS

| | | | | |
|---|---|---|---|---|
| 5,834,856 A | * | 11/1998 | Tavallaei et al. | ............... 307/64 |
| 5,860,137 A | | 1/1999 | Raz et al. | |
| 5,917,997 A | * | 6/1999 | Bell et al. | ........................ 714/4 |
| 6,249,879 B1 | * | 6/2001 | Walker et al. | ................. 714/11 |
| 6,360,331 B2 | * | 3/2002 | Vert et al. | ........................ 714/4 |

* cited by examiner

*Primary Examiner*—Nadeem Iqbal
*Assistant Examiner*—Timothy M. Bonura
(74) *Attorney, Agent, or Firm*—Wolf, Greenfield & Sacks, P.C.

(57) ABSTRACT

A method and apparatus for detecting a change in the operational status of a first host computer and automatically configuring a second host computer to provide additional computing resources that replace or complement the first host computer. In one embodiment, a controller is provided that is capable of detecting a malfunction or failure of the first computer and automatically configuring a second host computer to replace the first host computer. In another embodiment, the controller is capable of detecting changes in the performance of the first host computer and automatically configuring a second host computer to provide additional computing resources for the first host computer. In a further embodiment, both of these techniques can be used to support an electronic commerce site and provide the electronic commerce site with failsafe operation and virtually unlimited computational resources.

48 Claims, 15 Drawing Sheets

METHOD AND APPARATUS FOR PROVIDING HOST RESOURCES FOR AN ELECTRONIC COMMERCE SITE

FIELD OF THE INVENTION

The present invention is directed to information storage systems, and more particularly, to an information storage system that is capable of detecting a change in the operational status of a first host computer and changing the operation of a second host computer in response to the detected change.

DESCRIPTION OF THE RELATED ART

Providing replacement computer resources for a failed computer resource is termed site failover. Site failover is but one conventional example of a renewable host resource. Site failover from one computer system to another has historically been an expensive and labor intensive procedure. For example, to provide site failover for a first or primary computer system, a complete secondary or failover computer system was traditionally required. In the event of a failure of the primary computer system, the failover computer system would be brought up for use as a temporary replacement of the primary computer system, while the primary computer system was repaired.

To ensure that the failover computer system was a viable replacement for the primary computer system, data on the primary computer system would be periodically copied or backed up to the failover computer system for use in the event of failure of the primary computer system. Typically this back up would be performed manually over a network, or by tape, CD, or diskette. To facilitate site failover, the primary and failover computer systems were typically required to be identical, in terms of both hardware and software. In addition, to ensure that the failover computer system would be ready when needed, the failover computer system was typically maintained in an off state, until needed for replacing the primary computer system upon the failure of the primary computer system.

Years ago, site failures were typically due to a failure of the storage system to which a host computer was attached, rather than a failure of the host computer itself. This is because the storage system was frequently one of the least reliable components of the computer system. With the advent or more reliable storage systems featuring more reliable disk drives and other storage devices, data mirroring, data striping, etc., site failures are now more frequently caused by a failure in the host computer, rather than the storage system to which it is attached.

The use of more reliable storage systems has reduced some of the labor associated with site failover. Even so, some amount of manual intervention is still required. For example, when a failure occurs in a primary host computer, a new failover host computer still needs to be manually brought up in its stead. This typically requires powering down the primary host computer and the storage system, reconfiguring cables that were previously connected between the primary host computer and the storage system to reconnect them between the failover host computer and the storage system, powering on the failover host computer system and the storage system, and then bringing the failover host computer up on-line as a replacement for the primary host computer.

Although the use of more reliable storage systems can dispense with the need for a complete failover computer system (i.e., failover host computer and failover storage system), conventional methods of site failover are expensive. For example, because some amount of manual intervention is still involved, conventional methods of site failover require skilled personnel to be on hand while the primary host computer is operational to effect site failover, when necessary. In addition, most conventional methods of site failover still require that the primary host computer and the failover host computer be identically configured in terms of both hardware and software to facilitate site failover. This duplication of resources is expensive, both initially and in terms of upgrades. For example, when advances in computer technology render a primary host computer obsolete, the identically configured failover host computer is also rendered obsolete. Furthermore, because the failover host computer is typically maintained in a powered-off state until needed, a great deal of computing resources are wasted.

SUMMARY OF THE INVENTION

According to one aspect of the present invention, a method and apparatus for automatically configuring additional resources for a host computer is described. In one embodiment, a method is provided that includes acts of detecting a change in operation of a first host computer, and automatically configuring a second host computer to provide additional computational resources for the first host computer in response to the act of detecting.

According to another embodiment of the present invention, a computer system is provided. The computer system includes a first host computer, a second host computer, and a controller that is operatively coupled to the first host computer and the second host computer. The controller automatically configures the second host computer to provide additional computational resources for the first host computer in response to a change in operation of the first host computer.

According to another embodiment of the present invention, a computer system is provided that includes a first host computer, a second host computer, and configuration means, coupled to the first host computer and the second host computer, for automatically configuring the second host computer to provide additional computational resources for the first host computer in response to a change in operation of the first host computer.

According to another embodiment of the present invention, a storage system for use with a first host computer and a second host computer is provided. The storage system includes a first storage device to store data of the first host computer, and a controller that is coupled to the first storage device. The controller, when operatively coupled to the first host computer and the second host computer, automatically configures the second host computer to use the data of the first host computer and provide additional computational resources for the first host computer in response to a change in operation of the first host computer.

According to another aspect of the present invention, a method and apparatus for performing load balancing is described. In one embodiment, a method is provided that includes acts of detecting a decrease in performance of a first host computer, and automatically configuring a second host computer to provide additional computational resources for the first host computer in response to the act of detecting.

According to another embodiment of the present invention, a computer system is provided. The computer system includes a first host computer, a second host computer, and a controller that is operatively coupled to the first host computer and the second host computer. The controller automatically configures the second host computer to provide additional computational resources for the first host computer in response to a decrease in performance of the first host computer.

According to another embodiment of the present invention, a computer system is provided that includes a first host computer, a second host computer, and configuration means, coupled to the first host computer and the second host computer, for automatically configuring the second host computer to provide additional computational resources for the first host computer in response to a decrease in performance of the first host computer.

According to another embodiment of the present invention, a storage system for use with a first host computer and a second host computer is provided. The storage system includes a first storage device to store data of the first host computer, and a controller that is coupled to the first storage device. The controller, when operatively coupled to the first host computer and the second host computer, automatically configures the second host computer to use the data of the first host computer and provide additional computational resources for the first host computer in response to a decrease in performance of the first host computer.

According to a further aspect of the present invention, a method and apparatus for performing electronic commerce is described. In one embodiment, a method of performing electronic commerce includes acts of hosting an electronic commerce site on a first host computer, detecting a change in operation of the electronic commerce site, and automatically configuring a second host computer to host at least a portion of the electronic commerce site on the second host computer in response to the act of detecting.

According to another embodiment of the present invention, a computer system is provided. The computer system includes a first host computer that hosts an electronic commerce site, a second host computer, and a controller that is operatively coupled to the first host computer and the second host computer. The controller automatically configures the second host computer to host at least a portion of the electronic commerce site on the second host computer in response to a change in operation of the electronic commerce site.

According to another embodiment of the present invention, a storage system for use with a first host computer and a second host computer is provided. The storage system includes at least one first storage device to store data of the first host computer corresponding to an electronic commerce site hosted by the first host computer, and a controller that is coupled to the at least one first storage device. The controller when operatively coupled to the first host computer and the second host computer, automatically configures the second host computer to use at least a portion of the data of the first host computer that corresponds to the electronic commerce site to host a portion of the electronic commerce site on the second host computer in response to a change in operation of the electronic commerce site.

BRIEF DESCRIPTION OF THE DRAWINGS

Illustrative, non-limiting embodiments of the present invention are described by way of example with reference to the accompanying drawings, in which.

DETAILED DESCRIPTION

Figure 1:
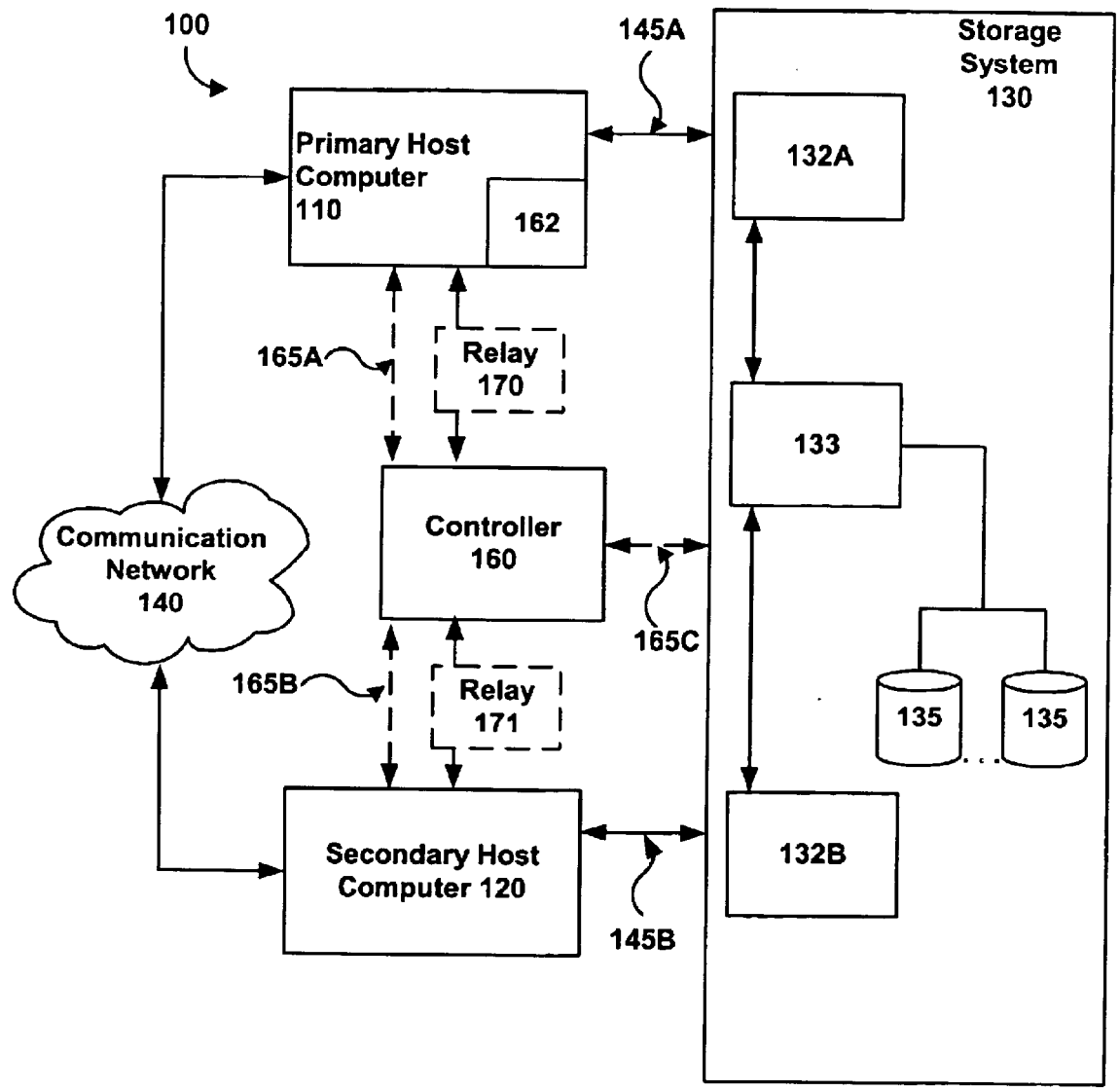
FIG. 1 illustrates a networked computer environment that includes two host computers that are coupled to a storage system and a controller that is capable of performing site failover from one host computer to the other according to one embodiment of the present invention.

Embodiments of the present invention will be understood more completely through the following detailed description which should be read in conjunction with the attached drawings in which similar reference numbers indicate similar structures.

Embodiments of the present invention are broadly directed to a method and apparatus for providing renewable host resources in a networked computing environment.

Within this disclosure, the term "networked computer environment" includes any computing environment in which a plurality of host computers are connected to one or more storage systems in such a manner that the storage system(s) can communicate with each of the host computers. One type of network in which embodiments of the present invention may be used is a Fibre Channel network, although the present invention is not so limited. For example, other network configurations and protocols may be used, such as Ethernet, FDDI, Token Ring, etc. Embodiments of the present invention may be used in Local Area Networks (LANS) as well as Wide Area Networks (WANS), with no requirement that the host computers or the storage system(s) reside in the same physical location, the same network segment, or even in the same network. Moreover, embodiments of the present invention may also be used with conventional point-to-point storage connections, such as SCSI, ESCON, etc. that are not typically viewed as a "network". In this regard, all that is necessary is that the storage system be capable of communicating with each host computer that is part of the renewable host resource environment, as will be described further below.

According to one aspect of the present invention, renewable host resources are provided that can be automatically (e.g., without any manual intervention by a system administrator or other personnel) configured and put into use when a change in the operational status of a host computer is detected. In one embodiment of the present invention, these renewable host resources are provided in the form of a secondary or failover host computer that can be automatically configured and brought on line to replace a failing primary host computer. In other embodiments of the present invention, the renewable host resources do not replace a primary host computer, but rather complement the operation of a primary host computer. In particular, these other embodiments of the present invention permit additional host computing resources to be dynamically configured and then added to and/or removed from the computer network dependent upon an operational status of the primary host computer. For example, when processing activity, memory utilization, etc. on a primary host computer reaches a threshold where the performance of the primary host computer is impacted, one or more additional host computers can be configured and brought on line to share the computational load.

According to a further aspect of the present invention, there is no requirement that the primary host computer or the secondary host computer(s) be identically configured, either in software or hardware. Furthermore, although embodiments of the present invention are described in terms of primary and secondary host computers, the present invention is not so limited. In this regard, the present invention may be used to provide renewable host resources for a computer site that includes a plurality of host computers. Moreover, as with individual host computers, the present invention is not limited to computer sites that reside in the same physical or network location, as primary and secondary computer sites may reside in different geographic locations.

FIG. 1 depicts one illustrative networked computing environment in which embodiments of the present invention may be used. As shown in FIG. 1, networked computing environment 100 includes a primary host computer 110 and a secondary host computer 120. As used herein, the term "host computer" refers to any computer that includes at least one processor, such as a personal computer (PC), a workstation, a mainframe, a networked client, etc., that is capable of communicating with other devices, such as a storage system or other host computers. The primary and secondary host computers 110, 120 communicate with each other over a communication network 140, such as Ethernet, Token Ring, Fibre Channel, etc. Each of the host computers 110, 120 is also connected to a storage system 130 by a respective connection 145A, 145B. Connections 145A and 145B may include a bus connection, such as SCSI or ESCON, or may include networked connections such as Fibre Channel. There is no requirement that connection 145A use the same type of connection or protocol as connection 145B. For example, connection 145A may use a point-to-point connection such as SCSI, while connection 145B may use a network connection such as Fibre Channel. Moreover, it should be appreciated that connections 145A and 145B may be implemented via the communication network 140.

As shown in FIG. 1, storage system 130 includes one or more storage devices 135 (e.g., disk drives) to service the storage needs of the host computers 110, 120. Storage devices 135 may include one or more disks of a recording medium, such as a magnetic recording medium or an optical recording medium. The storage devices may also include solid state storage devices, such as RAM-disks, as an alternative to or in addition to, more conventional forms of recording media. One example of a storage system that may be used with embodiments of the present invention is the SYMMETRIX line of storage systems available from EMC Corporation of Hopkinton, Mass. The SYMMETRIX line of storage systems is described in numerous publications from EMC corporation, including the SYMMETRIX model 55XX product manual, P-N200-810-550, rev. F, February, 1996. However, it should be appreciated that the present invention is not limited to the use of a SYMMETRIX storage system, as other storage systems may alternatively be used.

Storage system 130 also includes one or more port adapters 132A, 132B to connect to the primary and secondary host computers 110, 120, a storage processor or controller 133, and one or more disk adapters (not shown) that are operatively coupled to the storage devices 135. As the detailed structure of the storage system 130 is not necessary to understanding the present invention, and as the invention is not limited to any particular structure, further description of the storage system 130 is omitted herein.

According to one aspect of the present invention, computing environment 100 also includes a controller 160 that is operatively coupled to the primary host computer 110, the secondary host computer 120, and the storage system 130. In one embodiment of the present invention, the controller 160 is implemented in software executing on storage processor 133. In this embodiment, the controller 160 communicates with the primary and secondary host computers over connections 145A and 145B. As noted above, connections 145A and 145B may be point-to-point connections such as SCSI, ESCON, or network connections, such as Fibre Channel. Alternatively, controller 160 may be implemented separately from the storage system 130, for example, in a separate processor, as shown in FIG. 1. Where controller 160 is implemented separately from the storage system 130, controller 160 may communicate with the primary host computer 110, the secondary host computer 120, and the storage system 130 over connections 165A, 165B, and 165C as shown in dotted line form. Connections 165A, 165B, and 165C may be separate point-to-point connections, or network connections. Indeed, all that is necessary is that controller 160 be capable of communicating with the primary host computer 110, the secondary host computer 120, and the storage system 130.

Controller 160 is capable of automatically detecting a change in the operational status of the primary host computer 110 and, in response to this change in operational status, automatically altering the operational status of the secondary host computer 120. As used herein, the term "automatically" means without any manual intervention by a system administrator or other personnel. According to one embodiment of the present invention, controller 160 periodically queries the primary host computer 110 to determine its operational status. Based upon the response to this query, or the lack of a response to this query within a predetermined timeframe, the controller 160 can determine whether the operational status of the secondary host computer should be changed to provide additional host resources to complement or replace those provided by the primary host computer 110.

According to one embodiment to the present invention, controller 160 may be configured as a failover controller to configure and bring on-line secondary host computer 120 as a replacement for primary host computer 110 in the event that primary host computer 110 fails. When a failure of the primary host computer 110 is detected, controller 160 configures the secondary host computer 120 as a replacement for the primary host computer 110, shuts down the primary host computer 110, and then brings the secondary host computer 120 on line as a replacement to the primary host computer 110. Although controller 160 is capable of detecting the failure of the primary host computer 110, the controller 160 can also be capable of detecting malfunctions or other errors in the primary host computer 110 that do not amount to a complete failure. For example, malfunctions that may be detected include CPU errors or memory errors on the primary host computer 110, the malfunctioning of a network controller, an I/O controller, or adapter, or any other type of malfunction indicative of a diminished operational capacity of the primary host computer 110. In particular, in one embodiment of the present invention, controller 160 is capable of detecting malfunctions in the primary host computer 110 that are indicative of an imminent failure of the primary host computer 110. By detecting the imminent failure of the primary host computer 110 prior to actual failure, any data that is stored locally on the primary host computer 110 can be written to the storage system 130, and the primary host computer 110 can be shut down in an orderly manner. This reduces the possibility of lost data.

According to another embodiment of the present invention, an agent 162 is provided for the primary host computer 110 and communicates with the controller 160. In one embodiment, the agent 162 is implemented in software that executes on a processor in the primary host computer 110. The agent 162 monitors the operation of the primary host computer 110 and reports any errors to the controller 160. For example, agent 162 can monitor system error messages generated by the primary host computer 110 and report these messages to the controller 160. Alternatively, or in addition to monitoring error messages, the agent 162 can periodically run diagnostic tests on the primary host computer 110 to verify the operation of the primary host computer 110. It should be appreciated that varying levels of diagnostic tests may be run at different time intervals. For example, relatively quick diagnostic routines that are capable of detecting serious problems may be executed at shorter time intervals, while more extensive diagnostic routines capable of detecting less obvious or severe problems may be executed at longer time intervals. The agent 162 may include sophisticated detection routines that are capable of identifying a series of relatively minor errors that, over time, may indicate the imminent failure of one or more components of the primary host computer 110.

In one embodiment, the agent 162 is programmed to send a status report to the controller 160 at predetermined periodic intervals, irrespective of whether errors have been detected on the primary host computer 110. In this embodiment, when a status report has not been received by the controller 160 at an expected interval, the controller 160 assumes that the primary host computer 110 has failed and responds appropriately. As previously described, when a failure is detected by the controller 160, the controller 160 may shut down the primary host computer 110 and configure the secondary host computer 120 to act in its stead.

According to one embodiment of the present invention, the networked computer environment 100 may also include one or a number of relays 170, 171 that are coupled to the controller 160, a respective host computer, and a power supply (not shown) of the respective host computer. For example, relay 170 may be coupled between the primary host computer 110, the controller 160, and a power supply of the primary host computer 110, and relay 171 may be coupled between the secondary host computer 120, the controller 160, and a power supply of the secondary host computer 120. Each relay 170, 171 can be switched between a first state in which no power is supplied to the respective host computer, and a second state in which power is supplied to the respective host computer. In one embodiment, after the primary host computer 110 is shut down in an orderly manner, or after it is determined that an orderly shutdown is not possible, controller 160 can issue a command to relay 170 instructing the relay 170 to switch from the second state to the first state and cut-off power to the primary host computer 110. This ensures that the primary host computer 110 is no longer active on the network 140. Similarly, controller 160 can issue a command to relay 171 instructing the relay 171 to switch from the first state to the second state to provide power to the secondary host computer 120. This permits the secondary host computer 120 to be brought on-line as a replacement to the primary host computer 110 without any manual intervention (i.e., automatically).

Figure 2A:
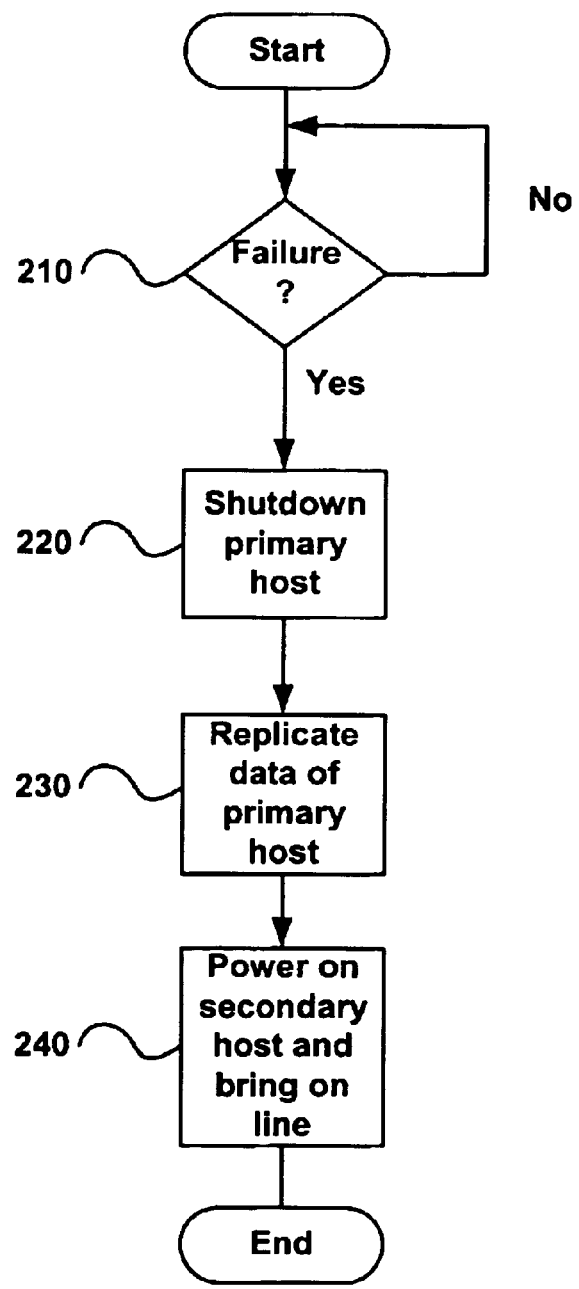
FIG. 2A is a flow diagram of a site failover routine that can be performed by the controller of FIG. 1 according to one embodiment of the present invention.

A flow diagram illustrating one implementation of a site failover routine that may executed by the controller 160 of FIG. 1 is now described with respect to FIG. 2A. For purposes of illustration, it is assumed that the primary and secondary host computers 110, 120 are identical in terms of hardware, and that the primary and secondary host computers 110, 120 are located in the same LAN (i.e., communication network 140). Because the primary and secondary host computers 110, 120 have identical hardware configurations, each is capable of using the exact same data (operating system data, application programs, and application program data) without modification. However, as will be described further below, the invention is not limited to use with identical host computers, nor is it limited to primary and secondary host computers that are located in the same LAN.

At step 210, the failover routine awaits the detection of a malfunction or failure of the primary host computer 110. As noted above with respect to FIG. 1, this may be detected in any number of ways, such as by being informed by an agent 162 of the primary host computer 110 that a malfunction or failure was detected or is imminent, by not receiving a status message from the agent 162 within a particular time interval, or by the controller 160 actively querying the primary host computer 110 as to its status. When it is determined at step 210 that no failure or imminent failure has been detected, the failover routine simply waits at step 210. Alternatively, when a failure or imminent failure is detected at step 210, the routine proceeds to step 220.

At step 220 the site failover routine performs an orderly shutdown of the primary host computer 110 if this is at all possible. For example, the controller 160 can be provided with the appropriate privileges on the primary host computer 110 so that, as long as the primary host computer 110 is capable of responding, the controller 160 can issue a command to the primary host computer 110 to perform an orderly shutdown. The form of the shutdown command will of course vary, depending upon the operating system used by the primary host computer 110. It should be appreciated that in many instances the failure of the primary host computer 110 may be such that an orderly shutdown of the primary host computer 110 is not possible, either due to an inability of the storage system 130 to communicate with the primary host computer 10, or for some other reason. When an orderly shutdown of the primary host computer 110 is not possible, step 230 may be omitted. However, it should be appreciated that an orderly shutdown of the primary host computer 110 will typically be attempted, as an orderly shutdown helps to ensure that the primary host computer 110 is no longer an active participant on the network. In addition, an orderly shutdown will generally cause any outstanding changes to data that is to stored locally in the primary host computer to be written to the storage system, so that the data stored on the storage system 130 is current.

In the event that the primary host computer 110 cannot be shutdown in an orderly manner, or in addition to shutting down the primary host computer 10 in an orderly manner, the controller 160 may also issue a command to relay 170 instructing the relay 170 to switch off power to the primary host computer 110. This ensures that the primary host computer 10 is no longer an active participant on the network.

After shutting down the primary host computer 110 at step 220, the site failover routine proceeds to step 230, wherein the data of the primary host computer 10 is replicated or copied to another storage device 135 of the storage system that can be accessed by the secondary host computer 120. In one embodiment, the data that is replicated at step 230 includes the operating system, as well as any application programs and application program data of the primary host computer 110. In this embodiment, each volume of data of the primary host computer 110 is copied to a corresponding volume of data on a storage device 135 that can be accessed by the secondary host computer 120 (e.g., a storage device 135 that can be accessed via port adapter 132B). In another embodiment, this replication of data is performed by splitting off a mirrored copy of each volume of data of the primary host computer 10 that is mirrored to a corresponding volume of data that is accessible to the secondary host computer 120.

After replicating the data of the primary host computer 10, the routine proceeds to step 240, wherein the site failover routine powers on the secondary host computer 120 and brings the secondary host computer 120 on line as an identical replacement to the primary host computer 110. The secondary host computer thus utilizes the replicated data (operating system data, application programs, and application program data) of the primary host computer 110 as if it were its own. In one embodiment, where the primary host computer 110 is configured to automatically boot to an on-line state upon power up, step 240 may be performed without any manual intervention. For example, controller 160 may issue a command instructing relay 170 to switch from the first state in which no power is supplied to the secondary host computer 120 to the second state in which power is supplied to the secondary host computer 120. As the primary host computer 110 and secondary host computer 120 share the same hardware configuration and can use the exact same data, the secondary host computer 120 will be automatically brought on-line as a replacement for the primary host computer 110 upon the application of power.

Alternatively, where the primary host computer 110 is not configured to automatically boot to an on-line state upon power up, an additional step may be required to bring the secondary host computer 120 on-line as a replacement for the primary host computer 110. For example, many host computers are configured to boot to a standalone state after the application of power. On a host computer running a Unix operating system, such a standalone state is termed single-user mode. In this stand alone state, the host computer can be instructed to perform certain limited commands, and is capable of certain low-level communication with peripheral devices (such as a control console or a storage system, for example), but is not a participant on the network. Typically such host computers require that an additional command be manually entered from a control console that is attached to the host computer to bring the host computer from the stand-alone state to an on-line state.

However, according to another embodiment of the present invention, this additional command may be provided to the secondary host computer 120 automatically by the controller 160. For example, after instructing relay 170 to supply power to the secondary host computer 120, the controller 160 may issue an appropriate command (e.g., boot or b) to the secondary host computer 120 to bring it from a stand alone state to an online state. In this manner, the secondary host computer 120 can be automatically brought on-line as a replacement for the primary host computer 110. After bringing the secondary host computer 120 on line as a replacement for the primary host computer 110 in step 240, the routine terminates.

The flowchart of FIG. 2A is but one example of a site failover routine according to the present invention. It should be appreciated that many variations and modifications to this routine are possible. For example, rather than utilizing relays 170 and 171 to automatically power-off the primary host computer 110 and automatically power-on the secondary host computer 120, one or more of these steps may be performed manually. Such a modification still avoids the reconfiguration of cables and the backing up of data of the primary host computer 110 to the secondary host computer 120 that is conventionally required.

It should be appreciated that the step of replicating the data of the primary host computer 110 need not be performed after the detection of a malfunction or failure of the primary host computer 110 at step 210, as it may be performed may prior to a detected failure. For example, the data of the primary host computer 110 may be replicated at any time prior to a malfunction or failure of the primary host computer 110, such as shortly after the primary host computer 110 is booted and on-line. The replicated data may also be periodically updated, prior to a detected malfunction or failure of the primary host computer 110, to reflect any changes made to the data of the primary host computer 110 during operation. This ensures that the replicated data is as current as possible. Upon the detection of a malfunction or failure of the primary host computer 110, the data that was replicated (and perhaps also updated prior to the detected malfunction or failure) can then be updated to reflect any additional changes that were made to the data of the primary host computer 110 prior to the detected failure or malfunction. The updating of the replicated data may, for example, be performed using an incremental update facility, such as the Symmetrix Differential Data Facility (SDDF), available from EMC Corporation of Hopkinton Mass., that updates only data that has changed.

Furthermore, rather than replicating all of the data of the primary host computer 110 at step 230, only certain data may be replicated. For example, where the operating system of the primary host computer 110 is stored in a separate volume or storage device from the rest of the data (e.g., application programs and application program data), the operating system can be replicated at a time prior to a malfunction or failure of the primary host computer 110, and the remaining data of the primary host computer 110 can be replicated thereafter. Because the operating system of a host computer changes only infrequently, the operating system of the primary host computer 10 can be replicated for use by the secondary host computer 120 prior to a detected failure, and the secondary host computer 120 powered on and booted to a standalone state in advance of a detected failure. When a failure of the primary host computer 110 is detected, the primary host computer 110 can be shutdown, the remaining data (e.g., application programs and application program data) of the primary host computer 110 replicated, and the secondary host computer 120 brought on-line as a replacement to the primary host computer 110. Advantageously, this may be performed in a shorter amount of time than the routine of FIG. 2A because any power-up diagnostic routines that are typically executed upon power up of the secondary host computer 120 will have already been completed. Moreover, the secondary host computer 120 can be automatically brought on line as a replacement to the primary host computer 110 from a standalone state without the use of relay 171.

Where the operating system of the primary host computer 110 is replicated in advance of a detected failure, it should be appreciated that the primary and secondary host computers 110, 120 will each have identical node names, domain names, network addresses, etc. Thus, care must be taken to ensure that the secondary host computer 120 is maintained in a standalone state as long as the primary host computer 110 is operational, as network problems may ensue if the two host computers with identical network identities were simultaneously operational on the same network. As an alternative to maintaining the secondary host computer 120 in a standalone state, after replicating the operating system of the primary host computer 110, the secondary host computer 120 may be powered on and brought to a standalone state, and then dynamically configured in the standalone state to have a different host name, domain name, network address etc. than the primary host computer 110. The secondary host computer 120 may then be brought on line with this new identity. Upon the detection of a failure of the primary host computer 110, the secondary host computer may be shutdown to a standalone state, the configurable parameters (e.g., node name, domain name, network address, etc) of the secondary host computer 120 dynamically reconfigured to be the same as the primary host computer 110, the remaining data replicated, and the secondary host computer 120 rebooted and brought on line as a replacement for the primary host computer 110.

It should be appreciated that although the flowchart of FIG. 2A includes a step of replicating data (i.e., step 230), the present invention is not so limited. In this regard, rather than replicating the data of the primary host computer 110 at step 230, the controller 160 may instead modify the assignment of storage devices 135 used by the primary host computer 110 so that those storage devices are accessible to the secondary host computer 120. For example, referring to FIG. 1, the controller 160 can instruct the storage processor 133 to modify the assignment of those storage devices 135 assigned to port adapter 132A so that they are instead assigned to port adapter 132B. With this modification, no data replication is required, and the secondary host computer 120 can directly access the data of the primary host computer 110.

Other modifications may also be made to the site failover routine of FIG. 2A. For example, where the primary host computer 110 fails in a manner in which it is not shutdown in an orderly fashion resulting in a loss of data, the controller 160 can perform additional steps enabling the secondary host computer 120 to utilize a backup copy of data used by the primary host computer 110. That is, rather than using the data of the primary host computer 110 that was replicated in step 230, the controller 160 can utilize different data, such as the most recent known-good backup of data from the primary host computer 110. This data may be resident on other storage devices 135 of the storage system 130, or may be copied from another storage system (not shown) for this purpose. For example, prior to a failure of the primary host computer 110, the controller 160 may be provided with a location, on storage system 130 or elsewhere on the network, where the most recent known-good backup copy of data of the primary host computer 110 is kept. If, after attempting to shutdown the primary host computer at step 220, the controller 160 determines that the primary host computer 110 was not shutdown in an orderly fashion, or that the data of the primary host computer 110 has been corrupted, the controller 160 can replicate the most recent backup copy of data of the primary host computer 110.

It should be appreciated that even the use of a backup copy of data of the primary host computer 110 by the secondary host computer 120 may still result in a loss of data. For example, any data of the primary host computer 110 that was changed since the most recent backup of the primary host computer 110 will not have been backed up, and thus, would not be available for use by the secondary host computer 120. However, the amount of data that is lost can be minimized. For example, many applications maintain a transaction log file that identifies changes made to application data since the most recent back-up of that application data. One such application program having this capability is ORACLE database software, which maintains a transaction log file that identifies changes made to the ORACLE database. Where an application program maintains such a transaction log file, any changes that are identified in the log file can be applied to the backup copy of data prior to bringing the secondary host computer 120 on-line for use as a replacement to the primary host computer 110.

Figure 2B:
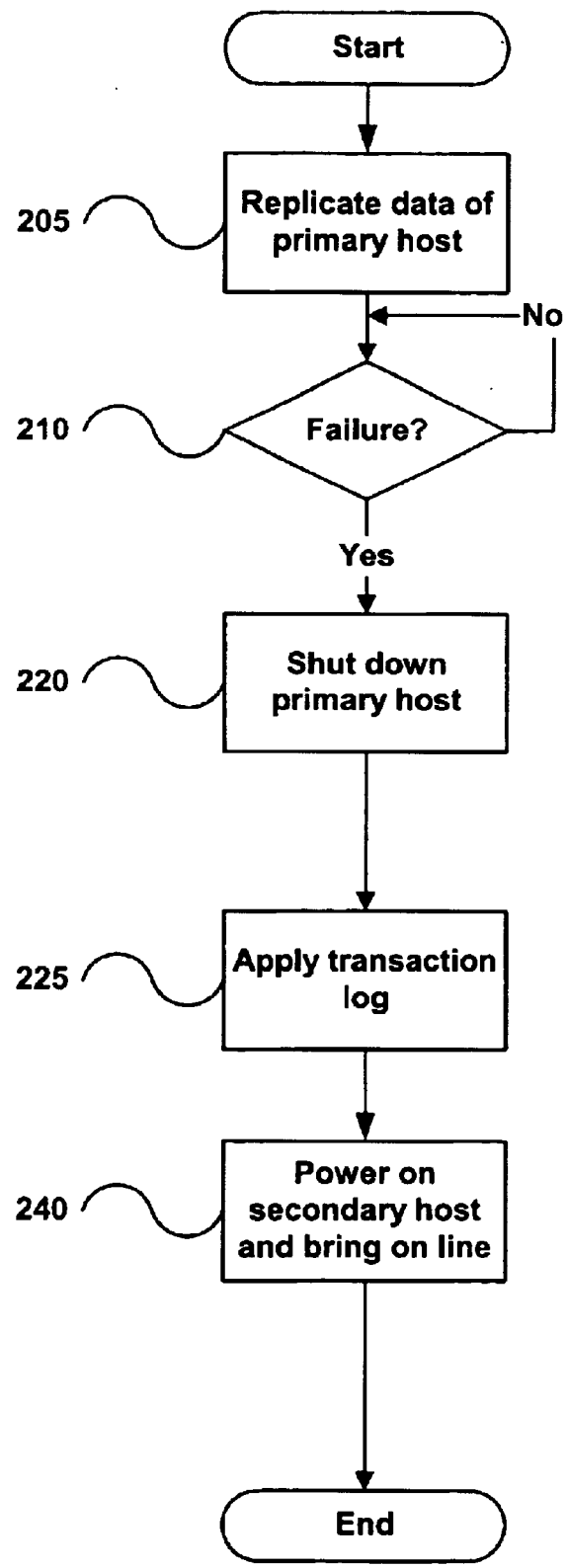
FIG. 2B is a flow diagram of another site failover routine that can be performed by the controller of FIG. 1 according to another embodiment of the present invention.

Another exemplary implementation of a site failover routine that may executed by the controller 160 of FIG. 1 is now described with respect to FIG. 2B. This site failover routine is particularly well suited for use with database applications such as ORACLE and SQL that maintain transaction log files which may be used to update the database. Again, for purposes of illustration, it is assumed that the primary and secondary host computers 110, 120 are identical in terms of hardware and located in the same LAN (e.g., communication network 140), although the present invention is not so limited.

At step 205 the data of the primary host computer 110 is replicated or copied to another storage device 135 of the storage system that is accessible to secondary host computer 120. In one embodiment, each volume of data of the primary host computer 110 is copied to a corresponding volume of data on a storage device 135 that can be accessed by the secondary host computer 120 (e.g., a storage device 135 that can be accessed via port adapter 132B). In another embodiment, this replication of data is performed by splitting off a mirrored copy of each volume of data of the primary host computer 110 that is mirrored to a corresponding volume of data that is accessible to the secondary host computer 120. In one embodiment, the data that is replicated at step 205 includes all of the data of the primary host computer 110 that is stored on the storage system 130, including the operating system as well as any application programs and application program data. It should be appreciated that this step of replicating may be performed any time prior to failure or malfunction of the primary host computer 110, and that the present invention is not limited to a replication of all of the data of the primary host computer 110. After replicating the data of the primary host computer 110, the routine proceeds to step 210.

At step 210, the failover routine awaits the detection of a malfunction or failure of the primary host computer 10 in a manner similar to that described with respect to FIG. 2A. When it is determined at step 210 that no failure or imminent failure has been detected, the failover routine simply waits at step 210. When a failure or imminent failure is detected at step 210, the routine proceeds to step 220.

At step 220 the site failover routine performs an orderly shutdown of the primary host computer 110 in a manner similar to that described with respect to FIG. 2A. After shutting down the primary host computer 10, the routine proceeds to step 225, wherein the controller 160 locates the transaction log file and applies that transaction log file to the appropriate application program data that was replicated in step 205. The transaction log file can be located by the controller by using the mapping techniques described in copending U.S. patent application Ser. No. 09/107,538, entitled METHOD AND APPARATUS FOR GRAPHICALLY DISPLAYING MAPPING OF A LOGICAL OBJECT, filed Jun. 30, 1998, and commonly assigned to EMC Corporation of Hopkinton, Mass., which is hereby incorporated by reference in its entirety. The transaction log file is applied to update the application program from the time that the data was replicated at step 205. After applying the transaction log file in step 225, the routine proceeds to step 240, wherein the secondary host computer 120 is powered on and brought on line in a manner similar to that described with respect to FIG. 2A. The routine then terminates.

The site failover routine of FIG. 2B permits the database application program data that is used by the secondary host computer 120 to be as up-to-date as possible. Furthermore, because the majority of the data of the primary host computer 110 (i.e., the operating system, the application program, and most of the application program data) is replicated prior to the failure of the primary host computer 110, when a failure is detected, this site failover routine can be performed in little more than the time it takes to locate and apply the transaction log file to the replicated data. Examples of systems on which aspects of the present invention can be employed to provide site failover include a SUN workstation running Oracle version 7.3.4 database software with version 2.5.1 or 2.6 of the SUN Solaris operating system, and a Intel Pentium computer running SQL 6.5 on Windows NT, version 4.0.

It should be appreciated that in both the previously described site failover routines, where a mirror copy of the data of the primary host computer 110 is used by the secondary host computer 120, any changes made by the secondary host computer to that split-off mirrored copy of data may be identified so that these changes can be applied to the data of the primary host computer 110 when it resumes operational status.

Figure 2C:
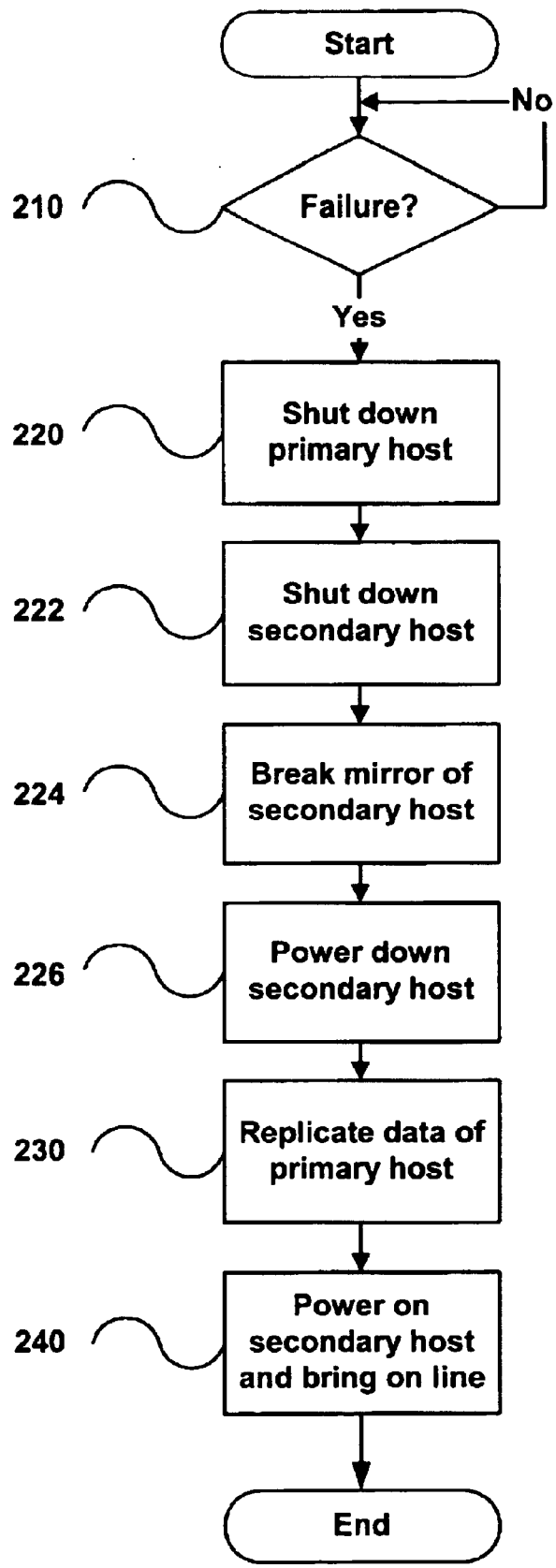
FIG. 2C is a flow diagram of another site failover routine that can be performed by the controller of FIG. 1 according to yet another embodiment of the present invention.

Another exemplary implementation of a site failover routine that may be executed by the controller 160 of FIG. 1 is now described with respect to FIG. 2C. As in the flowcharts of FIGS. 2A and 2B, it is again assumed, for purposes of illustration, that the primary and secondary host computers 110, 120 are identical in terms of hardware and that the primary and secondary host computers 110, 120 are located in the same LAN. However, in contrast to the site failover routine of FIGS. 2A and 2B where the secondary host computer 120 was initially in a powered off state, in this embodiment, both the primary and secondary host computers 1110, 120 may be fully operational on the same LAN, each with their own separate identities. In this embodiment, it is assumed that the secondary host computer 120 maintains a mirror copy of its data on other storage devices, although, as described further below, the present invention is not so limited. It should be appreciated that the data of the secondary host computer 120 may be mirrored to other storage devices 135 of storage system 130 (i.e., a local mirror) or to other storage devices 135 of a different storage system (not shown) that can communicate with storage system 130.

At step 210, the failover routine awaits the detection of a malfunction or failure of the primary host computer 110 in a manner similar to that described with respect to FIGS. 2A, and 2B. When it is determined at step 210 that no failure or imminent failure has been detected, the failover routine simply waits at step 210. Alternatively, when a failure or imminent failure is detected at step 210, the routine proceeds to step 220.

At step 220 the site failover routine performs an orderly shutdown of the primary host computer 110 in a manner similar to that described with respect to FIG. 2A. To ensure that the primary host computer 110 is no longer an active participant on the network, the controller 160 may also issue a command to instruct relay 170 to turn off power to the primary host computer 110. After shutting down the primary host computer 110, the site failover routine proceeds to step 222, wherein the secondary host computer 120 is shutdown in an orderly manner. This can be performed, for example, by notifying all users of the secondary host computer 120 that the secondary host computer 120 is being shutdown, instructing all users to log out of the secondary host computer 120, and then shutting down the secondary host computer 120 to bring it to a stand alone state. During such an orderly shutdown, any data that was resident in local memory of the secondary host computer 120 would then be flushed to the storage system 130. It should be appreciated that the above-described order of performing steps 220 and 222 may, of course, be reversed.

After shutting down the secondary host computer 120, the site failover routine issues an instruction to the storage system 130 to break or discontinue the mirroring of the data of the secondary host computer 120. Thus, from this point onward, any changes made to the primary copy of the data of the secondary host computer 120 will no longer be replicated to the mirrored copy. After instructing the storage system 130 to break the mirroring of data, the site failover routine proceeds to step 226, wherein power to the secondary host computer 120 is turned off. This step may be performed automatically by issuing a command to relay 171, or alternatively, may be performed manually. After shutting off power to the secondary host computer 120, the routine proceeds to step 230, wherein the data of the primary host computer 110 is replicated or copied to the secondary host computer 120 in a manner similar to that described with respect to FIGS. 2A and 2B. As should be appreciated, this step of replicating the data of the primary host computer 110 overwrites the primary copy of the data of the secondary host computer 120. However, because mirroring of the data of the secondary host computer was terminated at step 224, this replication does not affect the mirrored copy of the data of the secondary host computer 120. As a result, after the primary host computer 110 is returned to operational status, the data of the secondary host computer 120 that has been preserved on the split-off mirror copy can be copied back to its original location, and the secondary host computer 120 returned to normal operational status.

After replicating the data of the primary host computer 110, the routine proceeds to step 240, wherein the secondary host computer 120 is either manually or automatically powered on and brought on line as a replacement to the primary host computer 110, wherein the routine terminates.

Advantageously, the site failover routine of FIG. 2C permits both the primary and secondary host computers 110, 120 to be fully operational prior to a detected failure of the primary host computer 110. Moreover, both the primary and secondary host computers 110, 120 may have separate and independent identities prior to a detected failure. As a result, the computing resources of the secondary host computer 120 may be used to their full potential and need not be wasted by sitting idle or in a powered off condition waiting for the advent of a failure of the primary host computer 120.

Although the site failover routine of FIG. 2C was described in terms of a secondary host computer 120 that utilized data mirroring, it should be appreciated that the present invention is not so limited. For example, where the secondary host computer 120 does not use data mirroring, the site failover routine of FIG. 2C may be modified to make a backup copy of the data of the secondary host computer 120 prior to replicating the data of the primary host computer at step 230. The backup copy may be a local backup copy (i.e., local to storage system 130), or may be a remote backup copy (i.e., to a storage system other than storage system 130). Such a step of backing up the data of the secondary host computer 120 may be performed, for example, instead of step 224. Alternatively, where the data of the secondary host computer 120 has been recently backed up, or where the data of the secondary host computer 120 is not critical, step 224 of FIG. 2C may be omitted.

It should be appreciated that the replication of data that is performed in each of the site failover routine of FIGS. 2A–C may be performed without any involvement of the primary host computer 110. In particular, in a conventional site failover routine, the primary host computer 110 would be intimately involved in copying data from the storage devices used by the primary host computer 110 to those used by the secondary host computer 120. In contrast, in the embodiments of FIGS. 2A–C, the replication of data is performed by the controller 160 and without burdening any host computer. It should be appreciated that in conventional methods of site failover that require the participation of the primary host computer 110 in the replication of data, unless the replication is done prior to the failure of the primary host computer 110, data replication may not be possible (e.g., due to a fault in the host computer), or may result in corrupted data.

Figure 3:
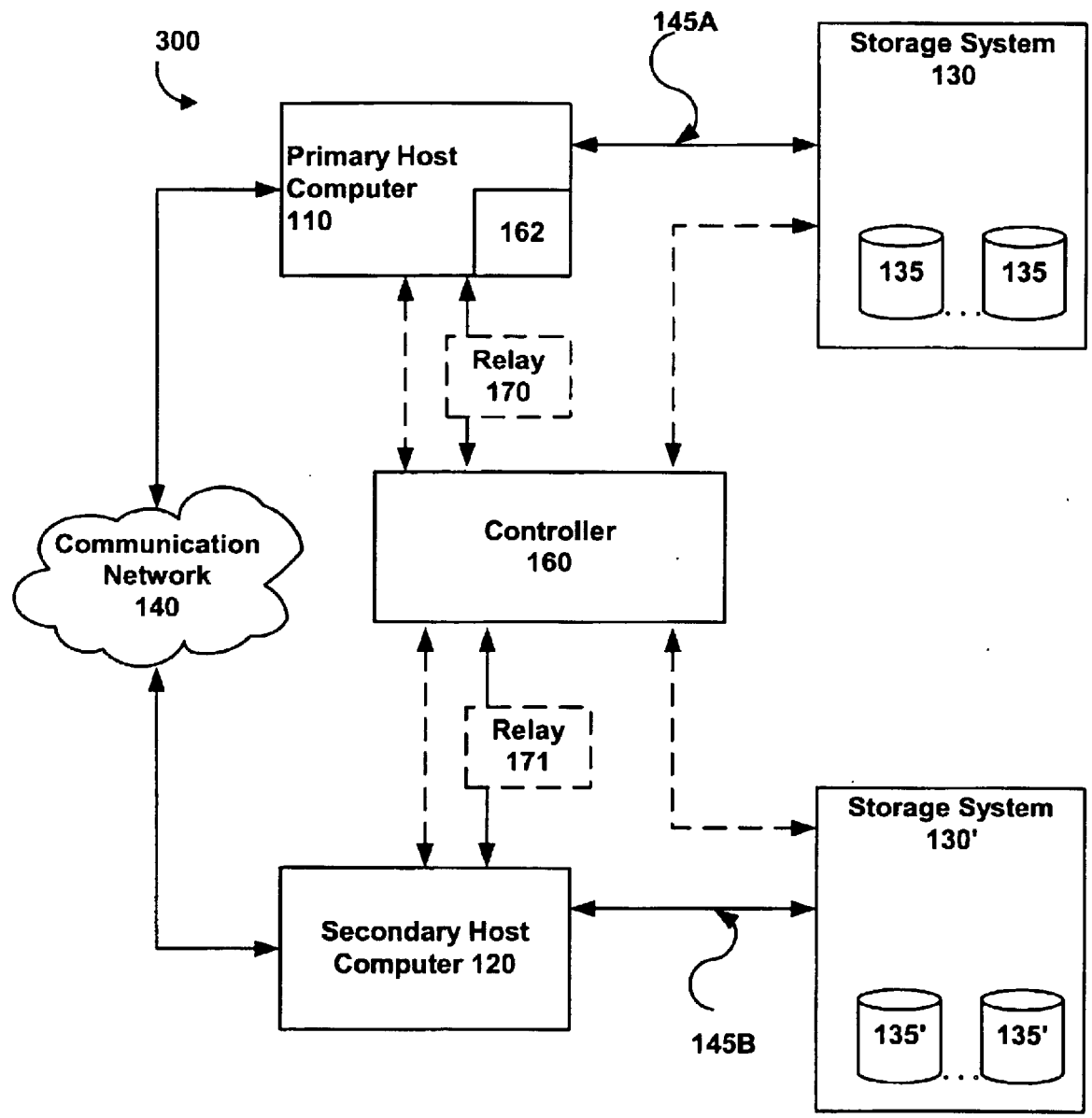
FIG. 3 illustrates a networked computer environment that includes two host computers that are coupled to different storage systems and a controller that is capable of performing site failover from one host computer to the other according to another embodiment of the present invention.

Although the exemplary site failover routines of FIGS. 2A, 2B, and 2C were described in terms of only a single storage system 130 to which both the primary and secondary host computers 110, 120 were connected, the present invention is not so limited. For example, FIG. 3 illustrates a networked computing environment 300 in which the primary and secondary host computers 110, 120 are connected to different storage systems 130 and 130', respectively. Primary host computer 110 communicates with storage system 130 over connection 145A, and secondary host computer 120 communicates with storage system 130' over connection 145B. Controller 160 is capable of communicating with each of the host computers 110, 120, and each of the storage systems 130, 130'. Controller 160 may be implemented in software executing on a storage processor 133 (FIG. 1) in one of the storage systems 130 or 130', or may be implemented separately from the storage systems, as shown. In a manner similar to that described with respect to FIG. 1, controller 160 may communicate with the primary host computer 110, the secondary host computer 120 and the storage systems 130 and 130' over point-to point connections, or network connections, or a combination of point-to-point and network connections. In this regard, all that is necessary is that the controller 160 be capable of communicating with each host computer 110, 120 and each storage system 130, 130'.

In a manner similar to that of the computer environment 100 of FIG. 1, networked computer environment 300 may also include one or a number of relays 170, 171 that are coupled to the controller 160, a respective host computer, and a power supply (not shown) of the respective host computer. Each relay 170, 171 can be switched between a first state in which no power is supplied to the respective host computer, and a second state in which power is supplied to the respective host computer.

Figure 4:
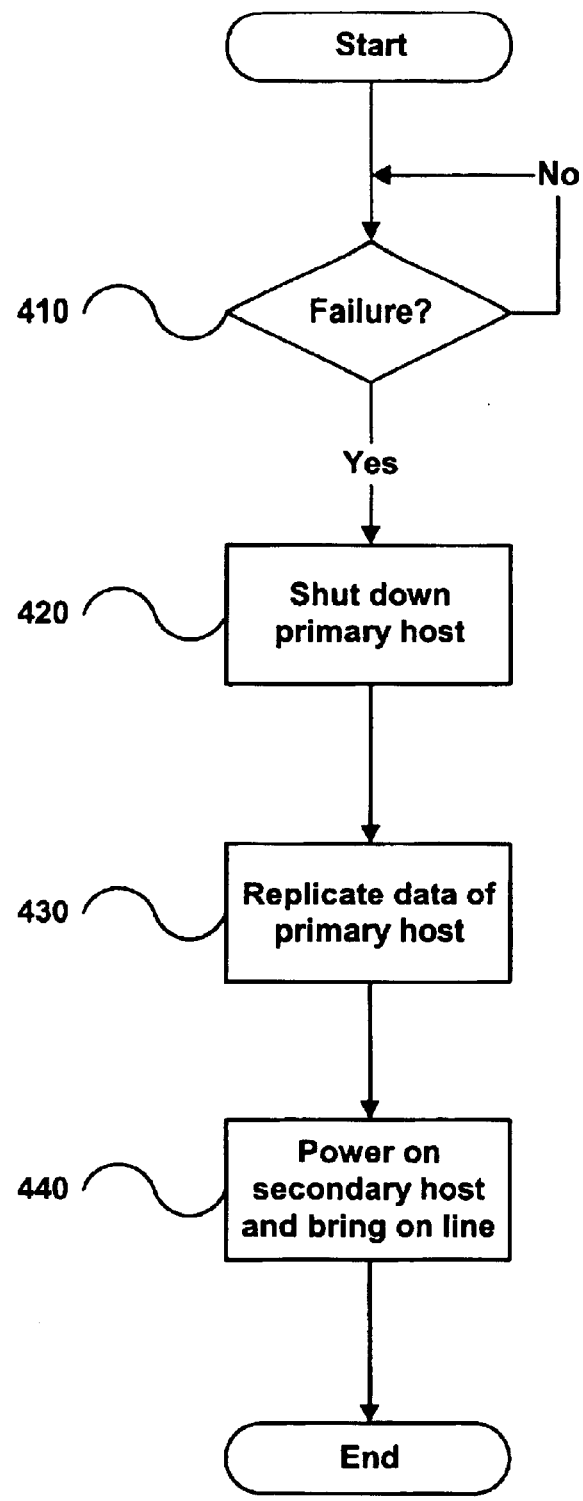
FIG. 4 is a flow diagram of a site failover routine that can be performed by the controller of FIG. 3 according to an embodiment of the present invention.

An exemplary flow diagram illustrating one implementation of a site failover routine that may be executed by the controller 160 of FIG. 3 is now described with respect to FIG. 4. The site failover routine of FIG. 4 is essentially identical to that described above with respect to FIG. 2A. However, rather than the data of the primary host computer being replicated to other storage devices 135 on the same storage system 130, the data is instead replicated to the storage devices 135' of a different storage system 130'. Again, for purposes of illustration, it is assumed that the primary and secondary host computers 10, 120 are identical in terms of hardware, and that the primary and secondary host computers 110, 120 are located in the same local area network. However, as will be described further below, the present invention is not limited in this regard.

At step 410, the failover routine awaits the detection of a malfunction or failure of the primary host computer 110. When a failure or imminent failure is detected at step 410, the routine proceeds to step-420, wherein the site failover routine performs an orderly shutdown of the primary host computer 110, if possible. When an orderly shutdown of the primary host computer 110 is not possible, step 420 may be omitted. In the event that the primary host computer 110 cannot be shutdown in an orderly manner, or in addition to shutting down the primary host computer 110 in an orderly manner, the controller 160 may also issue a command to relay 170 instructing the relay 170 to switch off power to the primary host computer 110 in a manner similar to that described above with respect to FIGS. 2A–C. This ensures that the primary host computer 110 is no longer an active participant on the network. After shutting down the primary host computer 110, the site failover routine proceeds to step 430.

At step 430, the controller 160 replicates or copies the data of the primary host computer 110 from storage system 130 to storage system 130' for use by the secondary host computer 120. In one embodiment, all of the data used by the primary host computer 110 (i.e., the operating system, application programs, application program data, etc.) is replicated for use by the secondary host computer 120. In other embodiments, only portions of the data of the primary host computer 110 are replicated, as described further below. After replicating the data of the primary host computer 110, the routine proceeds to step 440, wherein the secondary host computer 120 is powered on and brought on line as an identical replacement to the primary host computer 110. After replacing the primary host computer 110, the routine terminates.

Although the site failover routine described above with respect to FIG. 4 includes a step of replicating the data of the primary host computer 110 stored on storage system 130 to storage system 130', the present invention is not so limited. For example, where the secondary host computer 120 can also communicate with storage system 130, the secondary host computer 120 may simply use the data of the primary host computer 110 that is stored on storage system 130. This may be performed, for example, where connections 145A and 145B are common network connections. Alternatively, where storage system 130' is used as a mirror for storage system 130 (for example, by using the Symmetrix Remote Data Facility (SRDF), available from EMC Corporation of Hopkinton, Mass., that allows data to be mirrored among physically different storage systems that can be located in the same, or different, geographic locations), mirrored data of storage system 130 may already be present on storage system 130'. When this is the case, the step of replicating the data of the primary host computer 110 would be unnecessary. As details of SRDF are described in numerous publications from EMC Corporation, a detailed discussion of this facility is omitted herein.

The site failover routine described with respect to FIG. 4 may also be modified in a number of other ways. For example, the secondary host computer 120 may be on-line prior to being called upon to replace the primary host computer 110, as discussed above, and may even have its own network identity, separate and independent from that of the primary host computer 110. Moreover, rather than replicating the data of the primary host computer 110 that is stored on storage system 130, the data may be replicated from a backup copy of that data. It should also be appreciated that some of the data (e.g., the operating system) of the primary host computer 110 may be replicated prior to a detected failure, and the remaining data replicated at a later time, in a manner similar to that described with respect to FIGS. 2A–C.

It should be appreciated that the replication of data that is performed in the site failover routine of FIG. 4 may also be performed without any involvement of the primary or secondary host computers 110, 120. In particular, in a conventional site failover routine, the primary and secondary host computers 110, 120 would be intimately involved in copying data from the storage system 130, transferring that data to the secondary host computer 120 via tape, diskette, or over the communication network 140, and then copying that data from the secondary host computer to storage system 130'. In contrast, the site failover routine of FIG. 4 requires little or no involvement of the primary and secondary host computers 110, 120 in replicating this data, as the copying is managed by the controller 160.

Each of FIGS. 1–4 was described in terms of a networked computing environment in which identically configured host computers were coupled to the same communication network 140. However, embodiments of the present invention are not limited to use on a single communication network, as they may be used in a variety of network topologies. For example, FIG. 5 illustrates a networked computing environment in which two identical host computers are connected to different networks.

Figure 5:
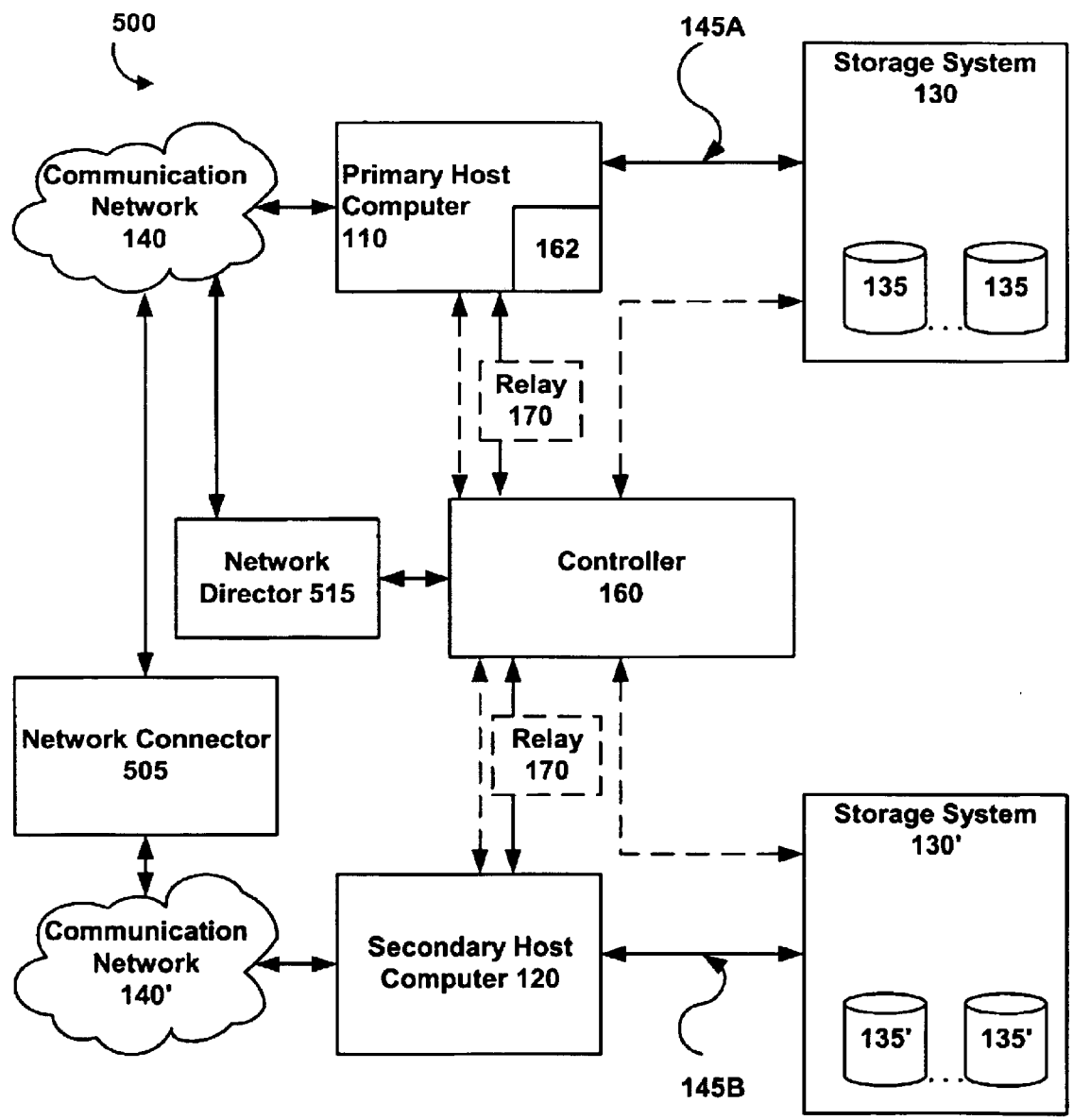
FIG. 5 illustrates a networked computer environment that includes two host computers that are coupled to different storage systems on different networks and a controller that is capable of performing site failover from one host computer to the other according to another embodiment of the present invention.

As shown in FIG. 5, networked computing environment 500 includes a primary host computer 110 that is coupled to a first storage system 130, a secondary host computer 120 that is coupled to a second storage system 130', and a controller 160 that is operatively coupled to the primary and secondary host computers 110, 120 and the first and second storage systems 130, 130'. The primary and secondary host computers 110, 120 are each coupled to a respective relay 170, 171, that communicates with the controller 160. In a manner similar to that described with respect to FIGS. 1 and 3, each relay 170, 171 is capable of providing power to the respective host computer in a first state and disabling the supply of power to the respective host computer in a second state.

The primary host computer 110 is coupled to a first communication network 140 and the secondary host computer 120 is coupled to a different communication network 140'. Communication between networks 140 and 140' is facilitated by a network connector 505. The network connector 505 may include a router or a bridge, or a number of routers and/or bridges that permit communication between networks 140 and 140'.

The networked computing environment 500 also includes a network director 515 that is coupled to communication network 140. As known to those skilled in the art, network directors are frequently used for load balancing and are capable of routing connection requests or other communications among a number of host computers. Some network directors are also capable of redirecting connection requests or other communications that are directed to a first host computer (e.g., to a network address of the first host computer) to another host computer (e.g., to a network address of another host computer). Examples of network directors that are capable of redirecting communications from one host computer to another host computer include local directors from Cisco System and Arrowpoint. As the functionality of network directors is well known in the art, a detailed discussion of the network director 515 is omitted herein.

As in the previously described embodiments of FIGS. 1–4, controller 160 may be implemented in software executing on a storage processor 133 (FIG. 1) in one of the storage systems 130, 130', or alternatively, may be implemented separately from the storage systems, as illustrated in FIG. 5. Controller 160 is capable of communicating with the primary and secondary host computers 110, 120, the first and second storage systems 130, 130', and the network director 515. Each of these communications may be by dedicated point-to-point connections, by network connections, or a combination of point-to-point and network connections. Controller 160 is also capable of communicating with each relay 170, 171. Each relay 170, 171 will typically be located in the same geographic location as the respective host computer to which it is coupled. To control each relay 170, 171, a communication path between the controller 160 and each relay 170, 171 is provided. For example, where the controller 160 and relay 170 are located in the same geographic location, and relay 171 is located in a different geographic location, the controller 160 may communicate with relay 170 via a direct local connection, and communicate with relay 171 using a remote connection, for example, by modem. Alternatively, controller 160 and relay 171 may be located in the same geographic location with relay 170 being located in a different geographic location, or both relays 170, 171 may be located in different geographic locations from the controller 160.

Figure 6:
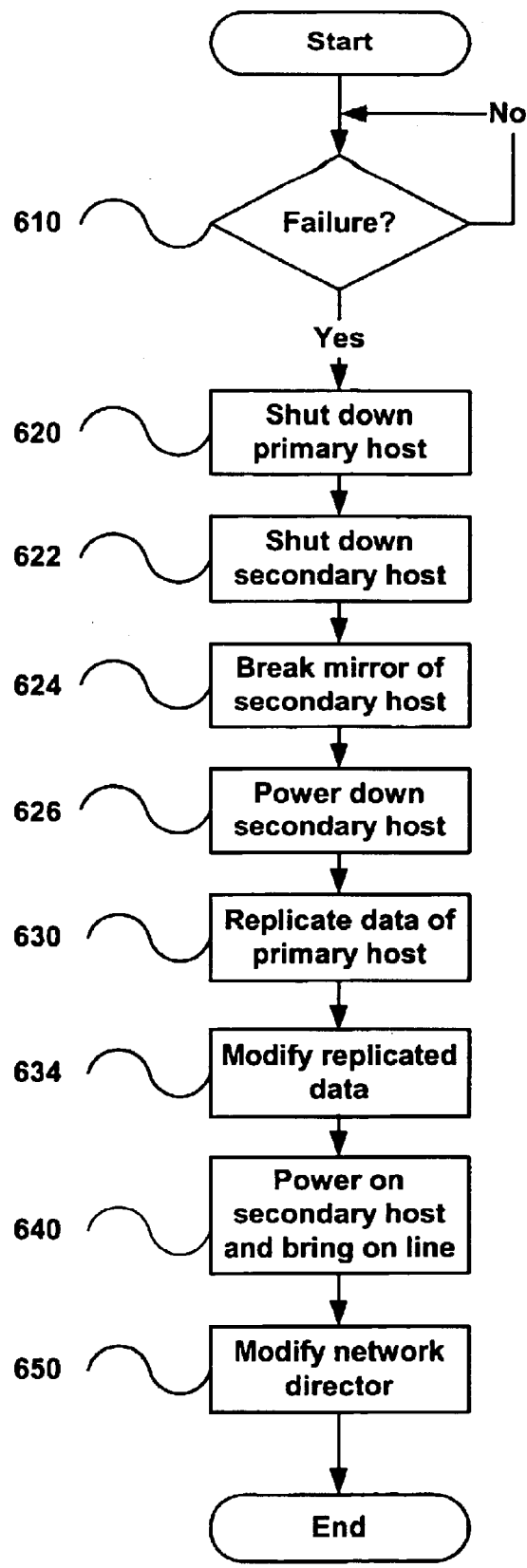
FIG. 6 is a flow diagram of a site failover routine that can be performed by the controller of FIG. 5 according to an embodiment of the present invention.

An exemplary flow diagram illustrating one implementation of a site failover routine that may be executed by the controller 160 of FIG. 5 is now described with respect to FIG. 6. Again, for purposes of illustration, it is assumed that the primary and secondary host computers 110, 120 are identical in terms of hardware, although the present invention is not so limited. In the exemplary site failover routine of FIG. 6, it is also assumed that the secondary host computer 120 is fully operational on network 140' with its own identity prior to a detected failure of the primary host computer 110, and that the secondary host computer maintains a mirror copy of its data on other storage devices in a manner similar to that of FIG. 2C. However, as described further below, the present invention is not so limited.

At step 610, the site failover routine awaits the detection of a malfunction or failure of the primary host computer 110 in a manner similar to that described with respect to FIGS. 2A–C, and 4. When it is determined that no failure or imminent failure has been detected, the failover routine simply waits at step 610. Alternatively, when a failure or imminent failure is detected at step 610, the routine proceeds to step 620, wherein the site failover routine performs an orderly shutdown of the primary host computer 110, if possible, in a manner similar to that described above. Once again, to ensure that the primary host computer 110 is no longer an active participant on the network, the controller 160 may also issue a command to instruct relay 170 to turn off power to the primary host computer 110.

After shutting down the primary host computer 110, the site failover routine proceeds to step 622, wherein the secondary host computer 120 is shutdown in an orderly manner. As discussed with respect to FIG. 2C above, this can be performed, for example, by notifying all users of the secondary host computer 120 that the secondary host computer 120 is being shutdown, instructing all users to log out of the secondary host computer 120, and then shutting down the secondary host computer 120 to bring it to a stand alone state. During such an orderly shutdown, any data that was resident in local memory of the secondary host computer 120 would then be flushed to the storage system 130.

After shutting down the secondary host computer 120, the site failover routine proceeds to step 624, wherein the controller 160 issues an instruction to the storage system 130' to break or discontinue the mirroring of the data of the secondary host computer 120. From this point onward, any changes made to the primary copy of the data of the secondary host computer 120 will no longer be replicated to the mirrored copy. After instructing the storage system 130' to break the mirroring of data, the site failover routine proceeds to step 626, wherein power to the secondary host computer 120 is turned off. This step may be performed automatically by issuing a command to relay 171, or alternatively, may be performed manually.

After shutting off power to the secondary host computer 120, the routine proceeds to step 630, wherein the failover routine replicates the data of the primary host computer 110 that is stored on storage system 130 to storage system 130' in a manner similar to that described with respect to FIG. 4. In one embodiment, all of the data used by the primary host computer 110 (i.e., the operating system, application programs, and application program data) is replicated to storage system 130' for use by the secondary host computer 120. As should be appreciated, this step of replicating the data of the primary host computer 110 overwrites the primary copy of the data of the secondary host computer 120 that is stored on storage system 130' with the replicated data of the primary host computer 110. However, because mirroring of the data of the secondary host computer 120 was terminated at step 624, this replication does not affect the mirrored copy of the data of the secondary host computer 120. As a result, after the primary host computer 110 is returned to operational status, the data of the secondary host computer 120 that has been preserved on the split-off mirror copy can be copied back to its original location, and the secondary host computer 120 returned to normal operational status. After replicating the data of the primary host computer 110, the routine proceeds to step 634.

At step 634, the controller 160 modifies the replicated data so that the secondary host computer 120 can use the replicated data and also be accessed via communication network 140'. Where the primary and secondary host computers 110, 120 are identical in terms of hardware, the data that is modified at step 634 corresponds to the configurable parameters of the primary host computer 110. As used herein, the term "configurable parameters" includes information such as the IP or other network address(es) of the primary host computer 110, the node name of the primary host computer 110, the domain name of the primary host computer 110, and any other relevant information of the primary host computer 110 that is unique to the primary host computer 110 and used to identify and allow access to the primary host computer 110 over the communication network to which it is attached (i.e., network 140). Typically these configurable parameters are saved in a configuration database that is accessed by the operating system of the primary host computer 110 and is stored on storage system 130.

When the data of the primary host computer 110 is replicated to storage system 130' for use by the secondary host computer 120, the replicated data will include the configurable parameters of the primary host computer 110. However, the use of the configurable parameters of the primary host computer 110 by the secondary host computer 120 may prevent access to the secondary host computer 120. This is because the primary and secondary host computers 110, 120 are located in different networks, and most bridges or routers filter or forward packets according to their destination IP or other network address. Thus, were the secondary host computer to keep the configurable parameters of the primary host computer 110, any communications originating outside network 140' and directed to the IP or other network address of the primary host computer 110 may not be routed or forwarded to network 140'.

To permit access to the secondary host computer 120 that is in a different LAN than the primary host computer 110, the configurable parameters of the primary host computer 110 are modified at step 634 to a value that is valid and not already in use in network 140'. For example, where the secondary host computer 120 already has an IP or other network address, node name, domain name, etc. that is valid in network 140' (e.g., prior to the secondary host computer 120 being shutdown in step 622), the configurable parameters of the primary host computer 110 may be modified to those prior values. This may be performed, for example, by saving configurable parameters of the secondary host computer 120 in a memory of the controller 160, or elsewhere, prior to step 630. After replication, the replicated data corresponding to the configurable parameters of the primary host computer 110 can then be modified by the controller 160 to reflect those of the secondary host computer 120.

In one embodiment of the present invention, the replicated data corresponding to the configurable parameters of the primary host computer 110 are directly modified by the controller 160 to a value that is valid on network 140'. This direct modification may be performed by understanding where this information is stored within the operating system of the primary host computer 110. For example, by comparing the data of the primary host computer 110 that is stored on storage system 130 when the configurable parameters of the primary host computer 110 have a first value to the data of the primary host computer 110 that is stored on storage system 130 when the configurable parameters of the primary host computer 110 have a second value, the location of where and how these configurable parameters are stored can be determined. By instructing the controller 160 to change the appropriate bits to a new value, the configurable parameters may thus be directly modified. However, as described further below, other methods may alternatively be used to modify the configurable parameters of the primary host computer, as the present invention is not limited to a particular method.

After modifying the configurable parameters of the secondary host computer 120, the routine proceeds to step 640, wherein the secondary host computer 120 is either manually or automatically powered on and brought on line as a replacement to the primary host computer 110. After bringing the secondary host computer 120 on line, the routine proceeds to step 650, wherein the controller 160 modifies the network director 515 to redirect any communications directed to the primary host computer 110 to secondary host computer 120. This may be performed in a well known manner by providing the network director 515 with the IP or other network addresses of the primary and secondary host computers 110, 120 and instructing the network director 515 to redirect all communications to the IP or other network address of the primary host computer 110 to the IP or other network address of the secondary host computer 120. From this point onward, any communications directed to the primary host computer 110 will be automatically redirected to the secondary host computer 120. Indeed, because most users request access to host computer systems by node or host name, most users will be unaware that that they are actually access ing a different host computer on a different network than the primary host computer 110. After modifying the network director 515, the site failover routine terminates.

It should be appreciated that the flowchart of FIG. 6 is but one example of a site failover routine that may be used with the computer environment of FIG. 5, and that many variations and modifications are possible. For example, where the primary host computer 110 fails in a manner in which it is not shutdown in an orderly fashion resulting in a loss of data, the data that is replicated at step 630 may be copied from a backup copy of the data of the primary host computer 110, in a manner similar to that described above with respect to FIG. 2A. Moreover, it is not required that the data of the secondary host computer 120 be mirrored, as the data of the secondary host computer 120 may be backed up prior to replication in step 630, or not backed up at all. It should further be appreciated that the replicated data corresponding to the configurable parameters of the primary host computer 110 need not be directly modified by the controller 160, as they may be modified indirectly. For example, after replicating the data of the primary host computer 110 in step 630, the secondary host computer 120 may be powered on and brought to a stand alone mode. In this standalone mode, the secondary host computer 120 can be dynamically reconfigured in a well known manner to use different configurable parameters. The secondary host computer 120 can then be either brought on line with those the new configurable parameters or rebooted and brought on-line.

Further, although the site failover routine described with respect to FIG. 6 included a step of modifying the data of the primary host computer 110 that was replicated to storage system 130', it should be appreciated that the appropriate modifications may be performed at other times. For example, the configurable parameters of the primary host computer 110 may be changed while that data is still stored on storage system 130, prior to any data replication, or alternatively, the configurable parameters of the primary host computer 110 may be modified during the replication process. Other modifications similar to those discussed with respect to the site failover routines of FIGS. 2A–C, and FIG. 4 may also be performed.

Although FIGS. 1–6 were described above in terms of identically configured primary and secondary host computers, the present invention is not so limited. In particular, embodiments of the present invention can also be used to provide renewable host resources for a primary host computer where the renewable host resources are not identical in hardware and/or software to the primary host computer. For example, the primary host computer may be a Windows NT system running an SQL database, whereas the secondary host computer may be a UNIX workstation capable of supporting an ORACLE database. Alternatively, the primary and secondary host computers may run the same type of operating system (e.g., UNIX) and application programs (e.g., ORACLE), but may differ in terms of hardware. For example, the primary host computer may be a multi-processor system, whereas the secondary host computer may include only a single processor. This aspect of the present invention is now described with respect to FIG. 7.

Figure 7:
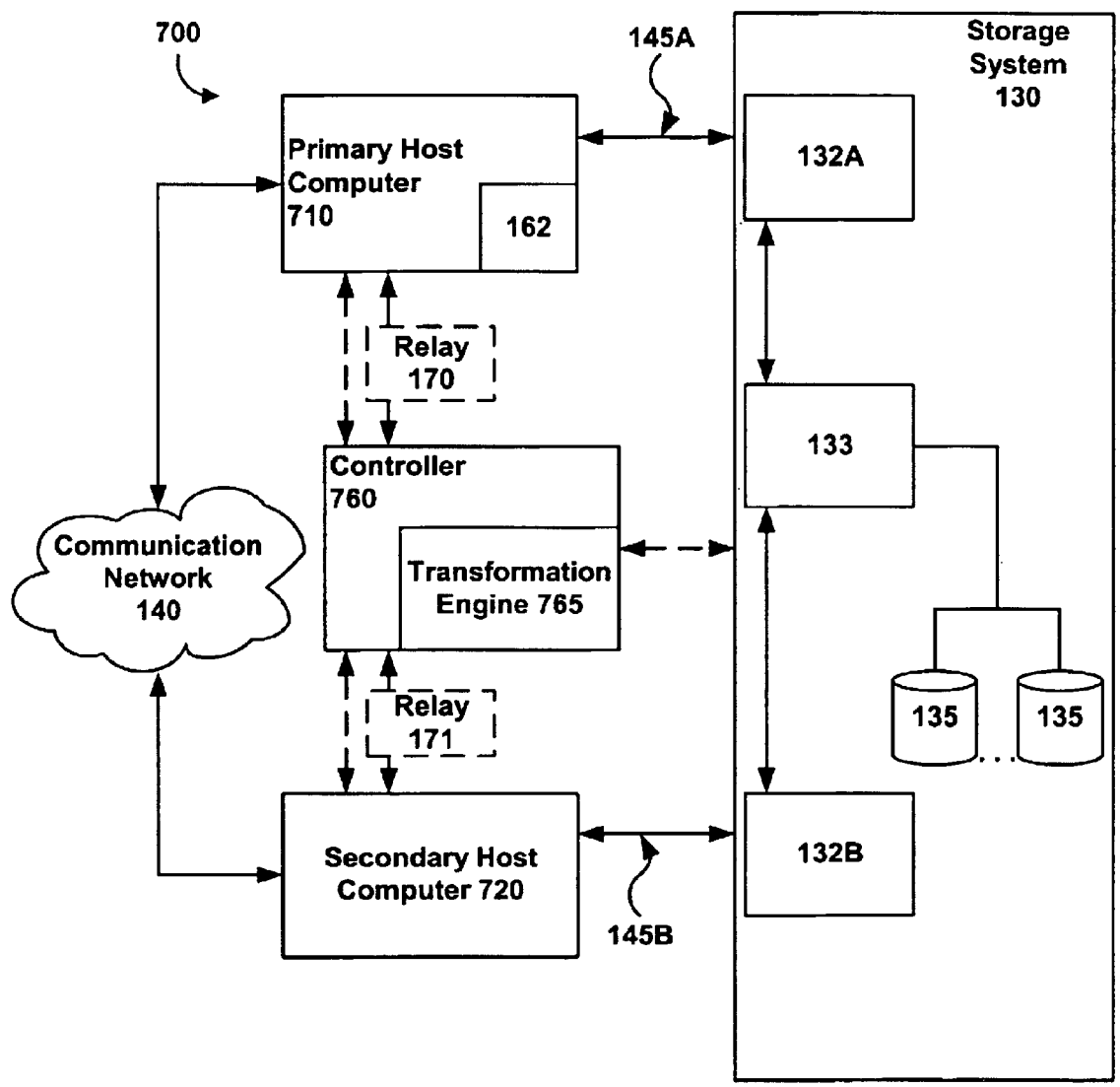
FIG. 7 illustrates a networked computer environment that includes two differently configured host computers that are coupled to a storage system and a controller that is capable of performing site failover from one host computer to the other according to another embodiment of the present invention.

As shown in FIG. 7, networked computing environment 700 includes a primary host computer 710 and a secondary host computer 720 that are coupled to a communication network 140 and a storage system 130. One, or both of the host computers 710, 720 may also be coupled to a respective relay 170, 171, as shown. Networked computing environment 700 also includes a controller 760 that is operatively coupled to the primary host computer 710, the secondary host computer 720, the storage system 130, and the relays 170, 171. However, in contrast to the networked computing environment of FIG. 1, the primary host computer 710 and the secondary host computer 720 need not be identical. In this regard, the primary and secondary host computers 710, 720 may differ in hardware, in software, or both.

To account for differences between the primary and secondary host computers 710, 720, controller 760 includes a transformation engine 765 that transforms data used by the primary host computer 710 into a format that can be used by the secondary host computer 720. Transformation engine 765 accesses information identifying the configuration (hardware and software) of the primary and secondary host computers 710, 720 and uses this information to determine what changes, if any, should be made to the data of the primary host computer 710 to allow that data to be used by the secondary host computer 720. Data of the primary host computer 710 that may be changed by the transformation engine 765 can include the data forming an application program or programs, application program data (i.e., the data accessed by one or more application programs), and even data that is accessed by the operating system, such as device drivers for network interface cards, communication adapters, etc.

As in the previously described controller 160 of FIG. 1, when a change in the operational status of the primary host computer 710 is detected by the controller 760, the controller 760 determines whether the operational status of the secondary host computer 720 should be modified to provide additional host resources to complement or replace those provided by the primary host computer 710. When the controller 760 determines that additional host resources are to be added, controller 760 automatically alters the operational status of the secondary host computer 720 to provide these additional resources. However, when the configuration of the primary host computer 710 differs from that of the secondary host computer 720, controller 760 also instructs the transformation engine 765 to make changes to the data of the primary host computer 710 to allow that data to be used by the secondary host computer 720.

In one embodiment of the present invention, controller 760 copies relevant data of the primary host computer 710 that is stored on storage device(s) 135 of storage system 130, instructs the transformation engine 765 to transform the relevant data to allow operation on the secondary host computer 720, and copies the transformed data to other storage locations that can be accessed by the secondary host computer 720. In a manner similar to that described with respect to FIGS. 1 and 2A–2C, the transformed data may be copied to a different storage device 135 of storage system 130 than that used by the primary host computer 710, or alternatively, the transformed data may be copied to a different storage system (e.g., storage system 130' in FIGS. 3 and 5), in the same network or in a different network, than that used by the primary host computer 710 in a manner similar to that described with respect to FIGS. 3–6. Once the relevant data has been copied and transformed, the secondary host computer 720 can be brought on line to provide these additional host resources.

Figure 8:
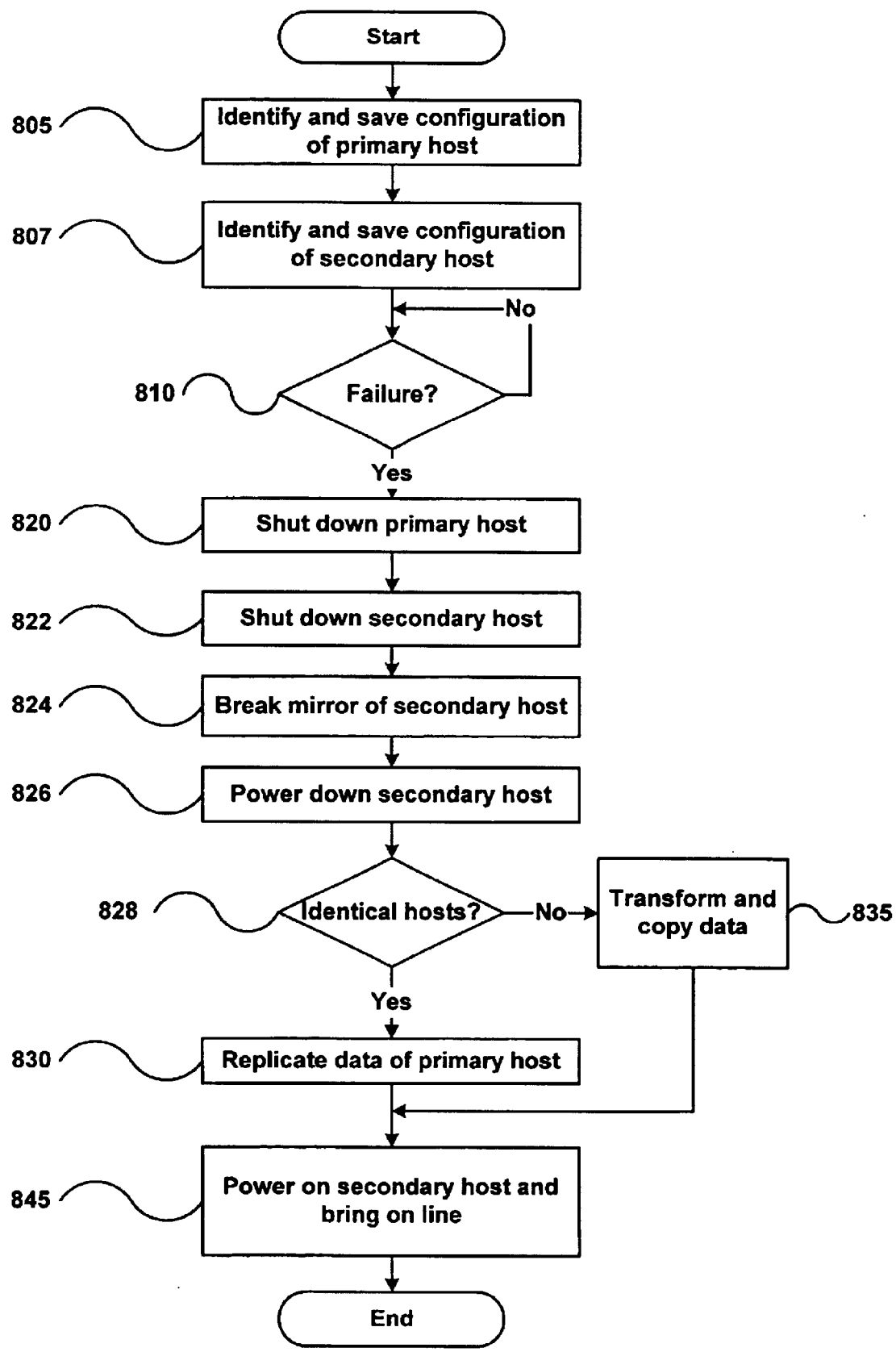
FIG. 8 is a flow diagram of a site failover routine that can be performed by the controller of FIG. 7 according to one embodiment of the present invention.

Operation of one embodiment of the present invention that is directed to a site failover is now described with respect to FIG. 8. Advantageously, this embodiment permits a secondary host computer 720 to be configured and brought on line to replace a primary host computer 710, even when the primary and secondary host computers 710, 720 are not identical. Although the operation of the site failover routine is now described in connection with a single storage system (i.e., storage system 130), it should be appreciated that it may also be used with multiple storage systems located in the same or different networks in a manner similar to that described above with respect to FIGS. 3–6. Moreover, although the site failover routine of FIG. 8 is described in terms of a secondary host computer 720 that maintains a mirror copy of its data and is located in the same LAN as the primary host computer 710, the present invention is not so limited, as described further below.

At step 805, the site failover routine identifies the configuration of the primary host computer 710 and saves this information. The information that is saved may include software related information identifying software that is used by the primary host computer 710 (such as the operating system (e.g., Solaris, SunOS, AIX, etc.), and its version used by the primary host computer 710, any application programs (e.g., Word, PageMaker, etc.), and their versions, used by the primary host computer 710, etc); hardware related information, such as the number and type of processors used by the primary host computer 710, the type (and revision level) of I/O or network controllers used by the primary host computer 710; as well as any of the configurable parameters of the primary host computer 710, such as the IP or other network address(es) of the primary host computer 710, its node name, its domain name, and other relevant information of the primary host computer 710 that is used to identify and allow access to the primary host computer 710. This information may be saved in any location accessible by the controller 760 and the transformation engine 765, such as a memory of the controller 760, a memory of the storage system 130, or in a storage device 135 of the storage system. In one embodiment of the present invention, where both the controller 760 and the transformation engine 765 are implemented in software executing on the storage processor 133 of the storage system, the configuration identification information is stored in the storage system 130. It should be appreciated that the configuration identification information that is saved at step 805 may be saved at any time after the primary host computer 710 is booted and on-line, and may updated whenever that configuration information changes, for example, when new software or hardware is added or removed.

After saving the configuration of the primary host computer 710, the site failover routine proceeds to step 807, wherein the site failover routine saves configuration identification information relating to the secondary host computer 720 in a manner similar to that of step 805. It should be appreciated that the configuration identification information of the secondary host computer 720 that is saved at step 807 may be saved at any time prior to the reconfiguration of the secondary host computer 720 as a replacement for the primary host computer 710. Moreover, this step of saving information identifying the configuration of the secondary host computer 720 may be executed more than once, whenever the configuration of secondary host computer 720 changes.

After saving information identifying the configuration of the primary and secondary host computers 710, 720, the site failover routine proceeds to step 810, wherein the failover routine awaits the detection of a malfunction or failure of the primary host computer 710. As described above with respect to FIGS. 1–6, this may be detected in any number of ways, such as by being informed by an agent (e.g., agent 162 in FIG. 1) of the primary host computer 710 that a failure was detected or is imminent, by not receiving a status message from the agent within a particular time interval, by the controller 760 actively querying the primary host computer 710 as to its status, or by a combination of any of the above techniques. When it is determined at step 810 that no failure, imminent failure, or other malfunction has been detected, the failover routine waits at step 810. When a failure, imminent failure, or other malfunction that impairs the operation of the primary host computer 710 is detected at step 810, the routine proceeds to step 820.

At step 820, the controller 760 performs an orderly shutdown of the primary host computer 710, if possible, and then proceeds to step 822. As noted previously, an orderly shutdown of the primary host computer 710 helps to ensure that the primary host computer 710 is no longer active on the network, and will generally cause any outstanding changes to data that is to be stored in the storage system 130 to be flushed from the primary host computer 710, so 30 that the data of the primary host computer 710 that is stored in storage system 130 is current. When an orderly shutdown of the primary host computer 710 is not possible, or in addition to performing an orderly shutdown of the primary host computer 710, the controller 760 may also issue a command to instruct relay 170 to turn off power to the primary host computer 710, thereby ensuring it is no longer an active participant on the network.

At step 822, the controller 760 shuts down the secondary host computer 720 in a manner similar to that described with respect to FIG. 2C, wherein the routine proceeds to step 824. At step 824, the controller 760 issues an instruction to the storage system 130 to break or discontinue the mirroring of the data of the secondary host computer 720 in a manner similar to that described with respect to FIG. 2C. After instructing the storage system 130 to discontinue the mirroring of data, the routine proceeds to step 826, wherein power to the secondary host computer is turned off. As noted with respect to FIG. 2C, this step may be performed automatically by issuing a command to relay 171, or alternatively, may be performed manually. After shutting off power to the secondary host computer 720, the site failover routine proceeds to step 828.

At step 828 the controller 760 determines whether the configuration of the primary and secondary host computers 710, 720 is identical. As should be appreciated by those skilled in the art, strict identity of the primary and secondary host computers 710, 720 is not necessary. That is, some differences between the primary and secondary host computers 710, 720, such as the clock speed at which the processors of the host computers operate, may not require any data transformation to operate on both the primary and secondary host computers 710, 720. As will be described further below, whether any changes should be made to the data of the primary host computer 710 to allow operation on the secondary host computer 720, and what those changes are, can be determined by actual experimentation. Once those changes are identified, a transformation routine can be provided to allow the transformation engine 765 to perform the necessary changes.

When it is determined at step 828 that the primary and secondary host computers 710, 720 are identical, such that no transformation of data is necessary, the routine proceeds directly to step 830. At step 830, the data of the primary host computer 720 is replicated or copied to the one or more storage devices 135 that are accessible to the secondary host computer 720 and on which the primary copy of the data of the secondary host computer 720 was previously stored. In one embodiment, the data that is replicated at step 830 includes the operating system, as wells as any application programs and application program data of the primary host computer 710. Although this step of replicating the data of the primary host computer 710 overwrites the primary copy of the data that was previously used by the secondary host computer 720, the mirrored copy is not affected. After replicating the data of the primary host computer 710, the secondary host computer 720 is either manually or automatically powered on and brought on line as an identical replacement to the primary host computer 710 in a manner similar to that described above with respect to FIG. 2C, wherein the routine terminates.

Alternatively, when it is determined at step 828 that the primary and secondary host computers are not identical and data transformation is required to allow operation on the secondary host computer 720, the routine proceeds to step 835. At step 835, the site failover routine copies and transforms any relevant data of the primary host computer 710 that is needed for use on the secondary host computer 720. The copied and transformed data is stored in the one or more storage devices 135 that are accessible to the secondary host computer 720 and on which the primary copy of the data of the secondary host computer 720 was previously stored. The data that is transformed and copied may include application program data, application programs, and even data that is accessed by the operating system, or portions of the operating system of the primary host computer 710. For example, where the primary and secondary host computers 710, 720 differ in hardware, but are both SUN workstations running the Solaris operating system version 2.5.1 or 2.6 and using ORACLE 7.3.4 database software, the data that is transformed and copied can include the operating system, the application program (e.g., the executable image of the application program) and the application program data. Only minimal changes are required to use the operating system data and the application program data of the primary host computer 710 on a differently configured secondary host computer 720, and no changes to the application program data are needed. It should be appreciated that what type of data (operating system data, application programs, or application program data) is transformed and copied at step 835 will depend upon the nature and extent of differences between the primary and secondary host computers 710, 720, as described further below. After transforming and copying the data at step 835, the routine proceeds to step 845 as described above, after which the routine terminates.

Advantageously, the site failover routine of FIG. 8 permits both the primary and secondary host computers 710, 720 to be fully operational prior to a detected failure of the primary host computer 710. In this regard, the primary and secondary host computers 710, 720 may both be active in the same, or in different networks, each with their own unique identity. It should be appreciated that when the primary and secondary host computers 710, 720 are located in different networks (e.g., FIG. 5), the site failover routine of FIG. 8 may be modified to permit access to the secondary host computer 720 from other networks. For example, after step 830, the data corresponding to the configurable parameters of the primary host computer 710 that was replicated at step 828 or replicated and transformed at step 835 may be modified to any value that is valid in the communication network in which the secondary host computer 720 is located. By saving the configuration information of the secondary host computer 720 at step 807, the configurable parameters of the secondary host computer may be reset to their prior value.

Other modifications and variations to the site failover routine may also be performed in a manner similar to those described above with respect to the site failover routine of FIGS. 2A–2C, 4, and 6. For example, when the primary host computer 710 fails in a manner in which it cannot be not shutdown in an orderly fashion, and data is lost, the controller 760 can be provided with a location of where the most recent backup copy of the data of the primary host computer 710 is stored, and can utilize that backup copy of data. As noted previously, the location of the most recent copy of backup data of the primary host computer 710 can be provided to the controller 760 prior to failure, so that manual intervention is not necessary. The backup copy may be resident on other storage devices 135 of the storage system 130, or may be copied from another storage system for this purpose. Once the backup data is obtained, any necessary translation of data may be performed as described above.

As noted above, the type of data that is copied from the primary host computer 710 and the nature and extent of any transformation of that data necessary to permit operation on the secondary host computer 720 will vary depending upon differences between the primary and secondary host computers 710, 720. Identifying what changes, if any, should be made to the data of the primary host computer 710 to allow operation on the secondary host computer 720 can be determined by actual experimentation. For example, by configuring the secondary host computer 720 with the same operating system, application programs and application program data as that used by the primary host computer 710, one can then compare the data used by each host computer. Any differences that are found can then be attributed to differences in the hardware of the primary and secondary host computers 710, 720. Where those differences are relatively few in number, the transformation engine 765 can then modify those portions of the data necessary to permit operation on the other host computer.

Alternatively, where the differences are greater in number, further analysis may be necessary to identify whether the differences are related to the operating system, the application programs, the application program data, or all of the above. Depending on where those differences are located (operating system, application programs, or application program data), only certain data may be copied (or copied and transformed) for use by the secondary host computer 720. For example, if significant differences are present between the data used by the primary host computer 710 and that used by the secondary host computer 720, but these differences are substantially limited to the operating system, the application programs and application program data of the primary host computer 710 may be capable of use on the secondary host computer 720 with little or no modification. An example of this situation is where the primary host computer 710 has only a single processor and the secondary host computer 720 has multiple processors, but both are capable of running the same type of operating system (e.g., Solaris) and application programs (e.g., ORACLE). In this example, the site failover routine of FIG. 8 may be modified to use the existing operating system of the secondary host computer 720 and copy (or transform and copy) only that data from the primary host computer 710 that relates to application programs and application data. This may be facilitated by storing the operating systems of the primary and secondary host computers 710, 720 on a different storage device 135 or storage volume than application programs and application program data.

Alternatively, an analysis of the differences between the data used by the primary host computer 710 and that used by the secondary host computer 720 may reveal that significant differences are present in both the operating system and the application programs (i.e., the executable images of the application programs) used by the primary and secondary host computers 710, 720, but not the application program data. Indeed, Applicants have found that despite significant differences in hardware between primary and secondary host computers, and despite significant differences between the operating systems and application programs of the primary and secondary host computers, the application data used by the same type of application program is frequently similar between two very different host computers. Where the application program data is similar, only this data can be replicated for use on the secondary or failover host computer. This is significant, because it is the application program data that is typically of most importance to users. Thus, where the application program data is sufficiently similar between the primary and secondary host computers, the site failover routine of FIG. 8 may be modified to use the existing operating system and application programs of the secondary host computer, and copy (or transform and copy) only the application program data from the primary host computer. Indeed, empirical testing has demonstrated that embodiments of the present invention may be used to transform ORACLE database application program data used by a SUN Solaris system for use with an ORACLE database application program on a Windows NT system, with only minor transformations needed to account for differences in file format.

According to a further embodiment of the present invention, a site failover routine is now described to provide site failover for a host computer that supports a database. This embodiment can be used to provide site failover for a primary host computer in which the secondary or failover host computer differs in terms of both hardware and software from the primary host computer. Although this embodiment is described in terms of a primary host computer that includes a SUN workstation running ORACLE version 7.3.4 database software on the Solaris to operating system, and a secondary host computer that includes an Intel Pentium-based server running SQL version 6.5 database software on a Windows NT operating system, it may readily be adapted to provide site failover for other computing environments. Further, although this embodiment is described with respect to primary and secondary host computers connected to a single storage system on the same network (e.g., computing environment 700 of FIG. 7), it should be appreciated that it may readily be modified for use with host computers connected to different storage systems on the same network, and with host computers connected to different storage systems on different networks. Operation of this exemplary embodiment is now described with respect to the flow diagram of FIG. 9.

At step 910, the site failover routine identifies the configuration of the primary and secondary host computers 710, 720 and saves this configuration identification information. In a manner similar to that described with respect to FIG. 8, the information that is saved may include identifiers of the type and version of the operating system used by the primary and secondary host computers 710, 720, identifiers of application programs and their versions, the number and type of processors used by the host computers, the type and revision level of I/O or network controllers, and any of the configurable parameters of the host computers, such as their IP or other network address(es), their node name, their domain name, and other relevant information of the primary and secondary host computers 710, 720 that is used to identify and allow access to the host computers. This configuration information may be saved in any location accessible by the controller 760 and the transformation engine 765, such as a memory of the controller 760, a memory of the storage system 130, or in a storage device 135 of the storage system.

After saving the information identifying the configuration of the primary and secondary host computers 710, 720, the site failover routine proceeds to step 915, wherein the controller 760 replicates and transforms the application program data used by the primary host computer 710 to permit use by the secondary host computer 720. In one embodiment, this step is facilitated by storing application program data of the primary host computer 710 in a location that is different from that of the operating system and application programs of the primary host computer 710 (e.g., in a different storage device 135 of the storage system than that used to store the operating system and application programs used by the primary host computer 710). The controller 760 locates and copies the application program data from the storage device 135 on which it is stored (or alternatively from a mirror of that storage device), transforms that application program data for use on the secondary host computer 720, and copies the transformed application data to another location (e.g., a different storage device 135) of the storage system 130 that can be accessed by the secondary host computer 720. Transformations that may be made to the application data can include modifying the file format in which the application program data is stored, modifying the data format (e.g., high order bit first, or high order bit last), etc. Those transformations that are necessary to permit use by the secondary host computer 720 can again be determined in advance, by entering the same application program data on different systems, and comparing the manner in which that data is stored by each application program. Once those differences are ascertained, the transformation engine 765 can be configured, in advance, to perform the necessary modifications.

After replicating and transforming the application program data, the routine proceeds to step 920, wherein the failover routine awaits the detection of a malfunction or failure of the primary host computer 710. The malfunction or failure of the primary host computer 710 may be detected in any number of ways, as described above with respect to FIGS. 1–8. When it is determined that no failure, imminent failure, or other malfunction has been detected, the failover routine waits at step 920. Alternatively, when a failure, imminent failure, or other malfunction that impairs the operation of the primary host computer 710 is detected at step 920, the routine proceeds to step 925.

At step 925, the controller 760 performs an orderly shutdown of the primary host computer 710, where possible, in a manner similar to that described previously with respect to FIGS. 1–8. As in the previously described embodiments, power to the primary host computer 710 may also be turned off either manually or automatically. After shutting down the primary host computer 710, the site failover routine proceeds to step 930. At step 930, the controller 760 locates, copies, and transforms the transaction log file of the application program on the primary host computer 710 to permit it to be applied to the transformed data that was replicated and transformed at step 915. The copied and transformed transaction log file may be temporarily stored in a memory of the controller 760, or a storage location in the storage system. The copied transaction log file for the database on the primary host computer 710 is modified so that the transformed data intended for use by the secondary host computer 720 can be updated to reflect any changes made since the application program data was replicated and transformed at step 915. Identifying what modifications are to be made to the copied transaction log file in step 930 can be determined in advance, based upon a knowledge of how application program data is stored, and how the transactions are logged, by each application program. For example, by comparing the same application program data entered into different databases on the primary and secondary host computers 710, 720 and analyzing how that data is stored by each database, the correspondence of how data is organized and stored by each database can be determined. By then changing data in each database and analyzing how that transaction is logged by each transaction log file, one can identify the correspondence between the transaction log file on the primary host computer 710 and that of the secondary host computer 720. Once it is determined how the transaction log file for the database application on the primary host computer 710 corresponds to that of the database application on the secondary host computer, the controller 760 may be configured, in advance of a failure of the primary host computer 710, to perform the necessary modifications during execution of the site failover routine. After transforming the transaction log at step 930, the routine proceeds to step 935.

At step 935, the transaction log file that was transformed at step 930 is applied to the transformed application program data that is to be used by the secondary host computer 720. This updates the application program data that will be used by the secondary host computer 720 to be as current as that on the primary host computer 710 when the failure occurred and the primary host computer was shut down. After applying the transaction log to the transformed data, the routine proceeds to step 940.

At step 940 the controller 760 modifies the configurable parameters of the secondary host computer 720 to be identical to those of the primary host computer 710. As discussed previously with respect to FIG. 6, this step may be performed when the secondary host computer 720 is in a stand alone state, but off-line. After configuring the secondary host computer 720 as a replacement to the primary host computer 710, the routine proceeds to step 945, wherein the secondary host computer 720 is brought on line as replacement to the primary host computer 710, and the routine terminates.

Figure 9:
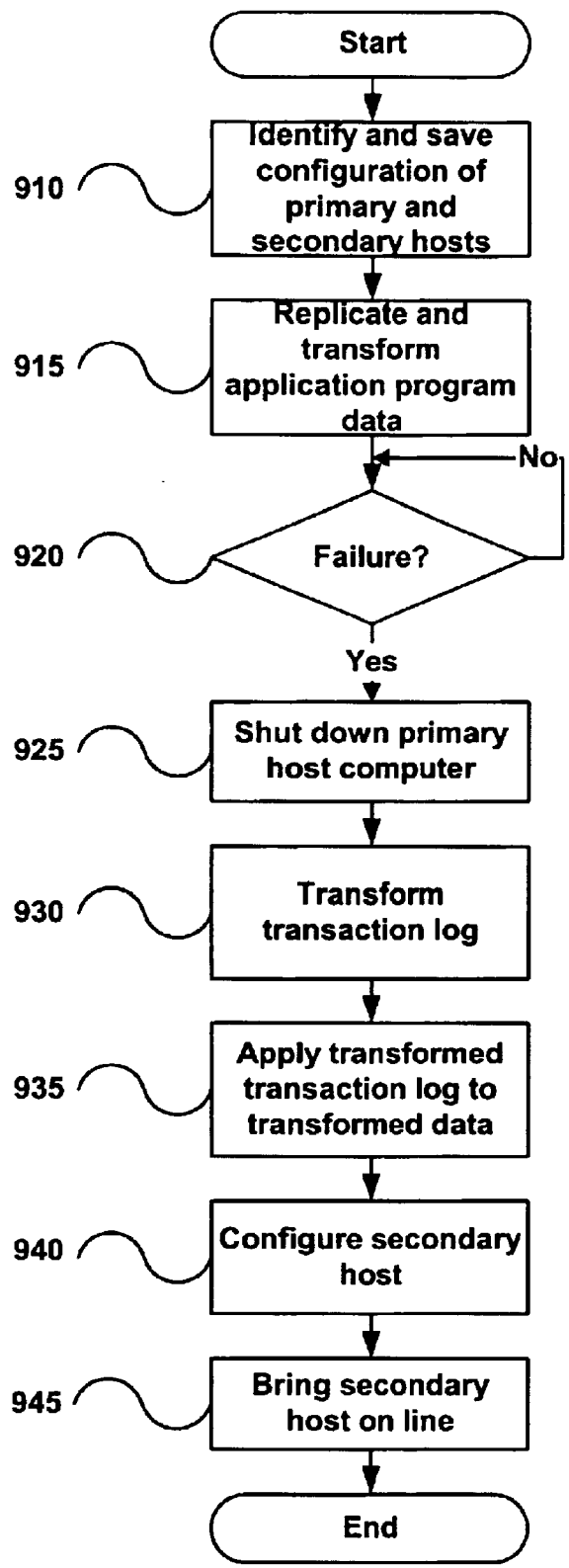
FIG. 9 is a flow diagram of another site failover routine that can be performed by the controller of FIG. 7 according to another embodiment of the present invention.

It should be appreciated that although the exemplary site failover routine of FIG. 9 included a step of transforming the transaction log file of the application program on the primary host computer 710 into a form that can be applied to the secondary host computer 720, the present invention is not so limited. For example, some application programs permit data files and/or transaction log files to be exported and imported in an application independent format. Where the database or other applications executing on the primary and secondary host computers 710, 720 support the exporting and importing in an application independent format, the application data or transaction log file may be exported from the primary host computer 710 and saved in an application independent format. The application program or transaction log file data can then be imported by the secondary host computer 720 for use by the application program and applied to the replicated data in a well known manner.

Although embodiments of the present invention have been described in terms of individual host computers (e.g., primary and secondary host computers 110, 120 of FIG. 1), the present invention is not so limited. In particular, it should be appreciated that each host computer described with respect to FIGS. 1, 3, 5, and 7 may include a plurality of host computers that together form a computing site. For example, FIG. 10 illustrates a networked computing environment in which renewable host resources may be provided for computing sites that include multiple host computers.

Figure 10:
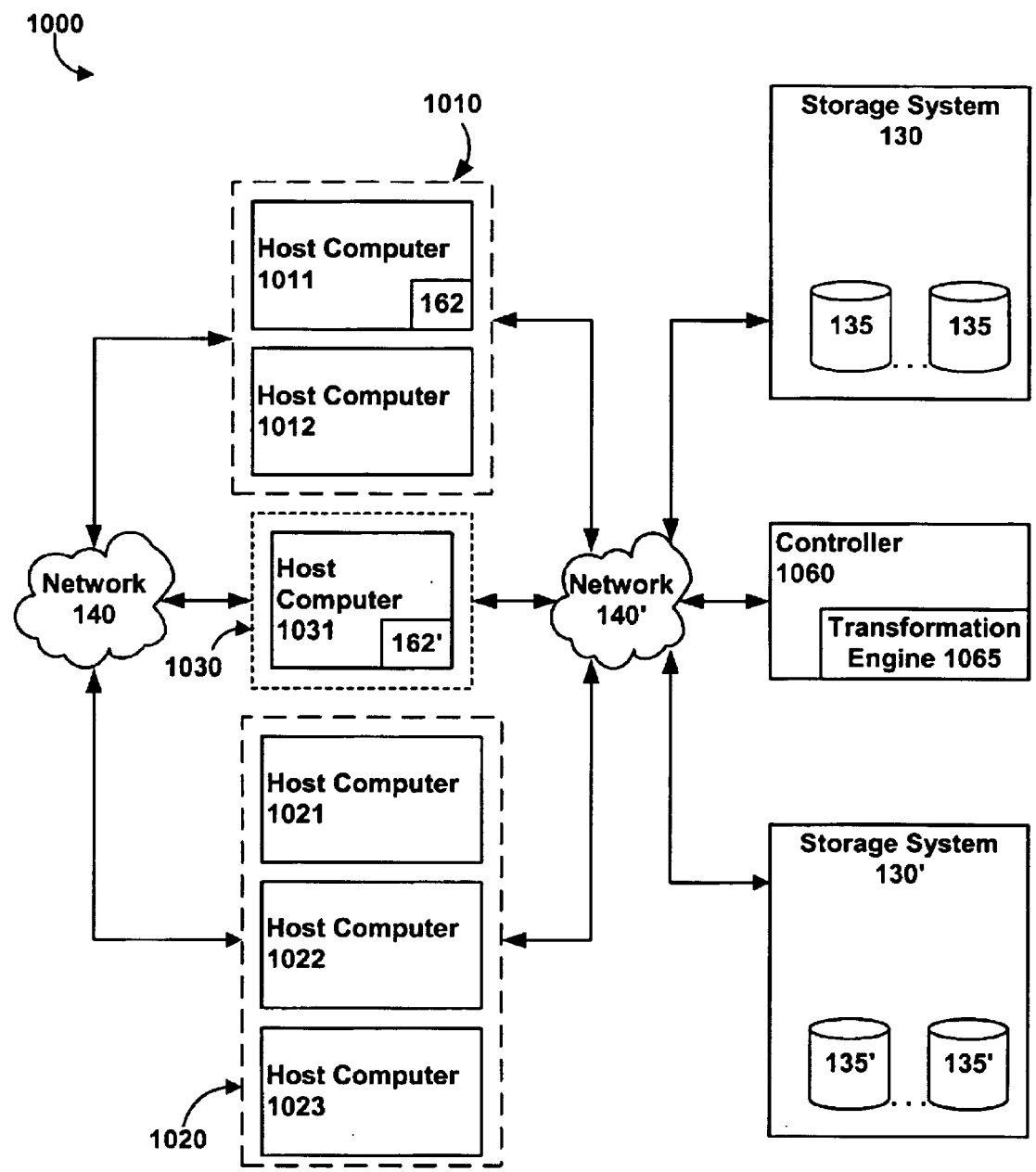
FIG. 10 illustrates a networked computer environment that includes a number of different computer sites that are coupled to different storage systems and a controller that is capable of performing site failover from one computer site to another according to another embodiment of the present invention.

As shown in FIG. 10, primary computer site 1010 includes two host computers 1011 and 1012, secondary computer site 1020 includes three host computers 1021, 1022, and 1023, and tertiary computer site 1030 includes a single host computer 1031. Each of these computer sites is coupled to a communication network 140. Each of these computer sites is also coupled to one or more storage systems 130, 130' and to a controller 1060 by a network 140'. The controller 1060 may be operatively coupled to a number of relays (not shown) that are capable of providing or shutting off power to a respective computer site, or to individual computer within a respective computer site. Controller 1060 is capable of providing renewable host resources for one or more of the host computer sites, and may include a transformation engine 1065 for transforming data for use by different host computers. Network 140' may be the same network or a different network than communication network 140. In this regard, all that is necessary is that controller 1060 be able to communicate with each host computing site 1010, 1020, 1030 that is part of the networked computing environment for which renewable resources are to be provided, and, where data is to be replicated to a different storage system (e.g., storage system 130'), with each storage system that is involved in the replication of data, by using a point to point connection, such as SCSI or ESCON, or by a network connection, such as Fibre Channel. Moreover, it should be appreciated that the host computer sites 1010, 1020, 1030 and the storage systems 130, 130' may be located in the same network 140, in different networks, and in different geographical locations.

In the exemplary networked computing environment of FIG. 10, secondary computing site 1020 may be configured as a failover site for primary computer site 1010, tertiary computer site 1030, or both. For example, when a failure of the primary computer site 1010 is detected, controller 1060 can configure the secondary computer site 1020 (e.g., host computers 1021, 1022) as a replacement for the primary computer site 1010, shut down the primary computer site 1010, and then bring the secondary computer site 1020 on line as a replacement to the primary computer site 1010 in the manner discussed above. Alternatively, when a failure of the tertiary computer site 1030 is detected, controller 1060 can configure the secondary computer site 1020 (e.g., host computer 1023) as a replacement for the tertiary computer site 1030, shut down the tertiary computer site 1030, and then bring the secondary computer site 1020 on line as a replacement to the tertiary computer site 1030. Were tertiary computer site 1030 to fail during the time that site failover was being provided for the primary computer site 1010, host computers 1021 and 1022 could provide site failover for the primary computer site, while host computer 1023 was configured to provide site failover for tertiary computer site 1030. Assuming that the primary and tertiary computer sites 1010, 1030 were identical to the secondary computer site 1020, no transformation of data by the transformation engine 1065 would be needed. Alternatively, when the primary computer site 1010 or the tertiary computer site 1030 is not identical to the secondary computer site 1020, and a failure of the primary computer site 1010 or the tertiary computer site is detected by the controller 1060, some data transformation may be needed prior to replacing the primary computer site 1010 or the tertiary computer site 1030.

In a manner similar to that described above with respect to FIGS. 1, 3, 5, and 7, an agent may be provided for each computer site, or for each host computer within a respective for which site failover is desired. For example, as shown in FIG. 10, both primary computer site 1010 and tertiary computer site 1030 include a respective agent 162, 162'. Each agent 162, 162' may be implemented in software that executes on a processor of the respective host computer 1011, 1031 to monitor the operation of the computer site and report any errors to the controller 1060. When notified by the agent 162 or 162' that a malfunction affecting the operation of a computer site has been detected, or when a status report has not been received at the appropriate interval, the controller 1060 shuts down the appropriate site 1010, 1030 and configures the secondary computer site 1020 to act in its stead. It should be appreciated that an agent can also be provided for each respective host computer within a respective computer site.

The operation of a site failover routine that may be performed by the controller 1060 of FIG. 10 is similar to that of FIGS. 2A, 2B, 4, 6, 8, and 9 described above. For example, where the primary computer site 1010 and the secondary computer site 1020 are identical and are coupled to the same network (e.g., network 140), the site failover routine of FIGS. 2A–2C and 4 may be executed by the controller 1060 to replace primary computer site 1010 with secondary computer site 1020. Alternatively, where the primary computer site 1010 and the secondary computer site are not identical, the site failover routine may operate in a manner similar to that discussed above with respect to FIGS. 8 and 9. As the operation of the site failover routine for the networked computing environment 1000 would be similar to those discussed previously, further detailed explanation of the operation of a site failover routine to be used with the networked computing environment 1000 of FIG. 10 is omitted.

It should be appreciated that the above described embodiments of the present invention overcome many of the disadvantages of conventional methods of site failover. For example, because a strict identity of host computers is not required, a single host computer or computer site can provide site failover for a number of different host computers or a number of different computer sites. Embodiments of the present invention are also capable of automatically performing site failover in the event of malfunction or failure, and thus dispense with the need for on site personnel to effect site failover. Indeed, no manual intervention by a system administrator or other personnel is required, as the detection of a malfunction or failure in the primary host computer or primary computer site and the subsequent configuration of a failover host computer can be performed automatically by the controller. Furthermore, embodiments of the present invention are virtually transparent to the host computer for which failover is provided, as the host computer is not involved in copying backup data for use in the event of a failure.

Although the present invention has been described in temms of providing site failover for a host computer in which a malfunction or failure is detected, it should be appreciated that site failover is but one example of a renewable host resource. In this regard, embodiments of the present invention may also be used to provide other types of renewable host resources. For example, rather than providing replacement host resources for a primary host computer, embodiments of the present invention may be also used to provide host resources that complement, not replace, the primary host computer.

Thus, according to another aspect of the present invention, a controller is provided that is capable of dynamically configuring another host computer to provide additional computer resources that complement those provided by a primary host computer. In one embodiment, the controller monitors the performance of a primary host computer, and when the controller detects that the performance of the primary host computer is deficient or below a predetermined threshold, the controller automatically configures additional host resources to share in the operational load of the primary host computer. Operation of this aspect of the present invention is now described with respect to the networked computer environment 100 of FIG. 1.

As discussed previously with respect to FIG. 1, controller 160 is capable of detecting a change in the operational status of the primary host computer 110 and, in response to that change in operational status, automatically altering the operational status of a secondary host computer 120. However, rather than detecting a malfunction or failure of the primary host computer, controller 160 may alternatively be adapted to detect a diminished performance of the primary host computer 10 and automatically configure the secondary host computer 120 to provide additional resources that complement the operation of the primary host computer 110.

According to one embodiment of the present invention, controller 160 periodically queries the primary host computer 110 to determine its performance. For example, the controller 160 may query the primary host computer 110 as to the amount of processor utilization, how much memory is being used, how frequently that memory is being swapped out to disk, how many I/O requests are pending, etc. Alternatively, the controller 160 may query the primary host computer 110 for higher level information, such as how many user requests are pending, or how many transactions per unit time are being serviced. Based upon the responses from the primary host computer 10 to those queries, the controller 160 can determine whether additional host computing resources should be provided. It should be appreciated that because the performance of a computer system can change significantly from one moment to the next, controller 160 may monitor the responses from the primary host computer 110 over time. For example, based upon changes in performance metrics of the primary host computer 110 over time, the controller 160 can determine whether those changes are transitory in nature, or are of a more sustained duration. Further, by a comparison of those performance metrics to a predetermined threshold of performance that provides an acceptable response, or by a comparison of those performance metrics to an operational capacity of the primary host computer 110, the controller 160 can determine whether performance is deficient and additional resources should be provided. When it is determined that performance of the primary host computer 110 is not of a transitory nature and the performance of the primary host computer 110 is below the predetermined threshold, the controller 160 can configure the secondary host computer 120 to share in the load of the primary host computer 110.

Alternatively, rather than the controller 160 periodically querying the primary host computer 110 as to its performance, an agent may be provided for the primary host computer that monitors its performance. For example, in FIG. 1, agent 162 may be modified to monitor various performance metrics such as processor utilization, memory utilization, how often memory is swapped out to disk, the number of pending I/O requests, etc., and report those metrics back to the controller 160. In one embodiment of the present invention, agent 162 monitors the performance of the primary host computer 110 and provides performance metrics to the controller 160 for analysis. Based upon a review of those metrics over time and a comparison of those metrics to a predetermined threshold, the controller 160 can determine whether additional host computer resources should be added. Alternatively, in another embodiment, the agent 162 monitors the performance metrics, compares those metrics over time to a predetermined threshold of performance, and informs the controller 160 when additional host computer resources should be added.

The performance monitoring of computers is well understood in the art. For example, there are numerous performance monitoring packages that are commercially available for different types of host computers (such as workstations, mainframes, PC's, etc.) and a myriad of operating systems that are capable of reporting a wide variety of performance metrics. Some of these performance monitoring packages measure and monitor performance metrics such as CPU utilization, cache hit rates, I/O utilization, memory utilization, etc. Other commercially available performance monitoring packages measure and monitor higher level information such as the number of transaction requests per unit of time (e.g., transaction requests per second) and the number of transaction requests being serviced per unit of time. Such commercially available performance monitoring packages can be installed and executed on a processor of the primary host computer 110 and their output periodically monitored by the controller 160, or agent 162. Alternatively, a dedicated performance monitoring routine may be implemented by the controller 160, or agent 162 that monitors performance in a manner that is similar to that provided by such commercially available monitoring routines. Because embodiments of the present invention are not limited to a particular method of monitoring performance, and because methods of monitoring performance are well understood in the art, further details of how performance can be monitored are omitted herein.

Further, although embodiments of the present invention monitor performance metrics and compare these metrics to a predetermined threshold to determine whether performance is deficient, the present invention is not limited to a particular metric nor a particular predetermined threshold. For example, as is known to those skilled in the art, the level of performance below which a host computer is viewed as deficient will vary based upon a number of factors. These factors include the capabilities of the host computer, the nature of the task being performed, the expectations of users, the cost of the computer services being provided, etc. For example, for a web based application, the predetermined threshold of performance can be based on a number of requests for information (i.e., hits) that can be serviced per second. Alternatively, the predetermined threshold can be based on the amount of time it takes for a request to be serviced. When the number of hits being received within a certain period is more than the amount that can be serviced within that certain period, or when the amount of time it takes to service a request increases beyond an acceptable level, it can be determined that additional host resources should be added to improve performance. The predetermined threshold can alternatively be based on the capacity of the host computer. For example, when a host computer reaches approximately 80% of its operational capacity, it can be determined that additional host resources be added to improve performance. Because the predetermined threshold will vary based upon a number of factors, and because the present invention is not limited to a specific performance metric or predetermined threshold, further discussion is omitted herein.

Figure 11:
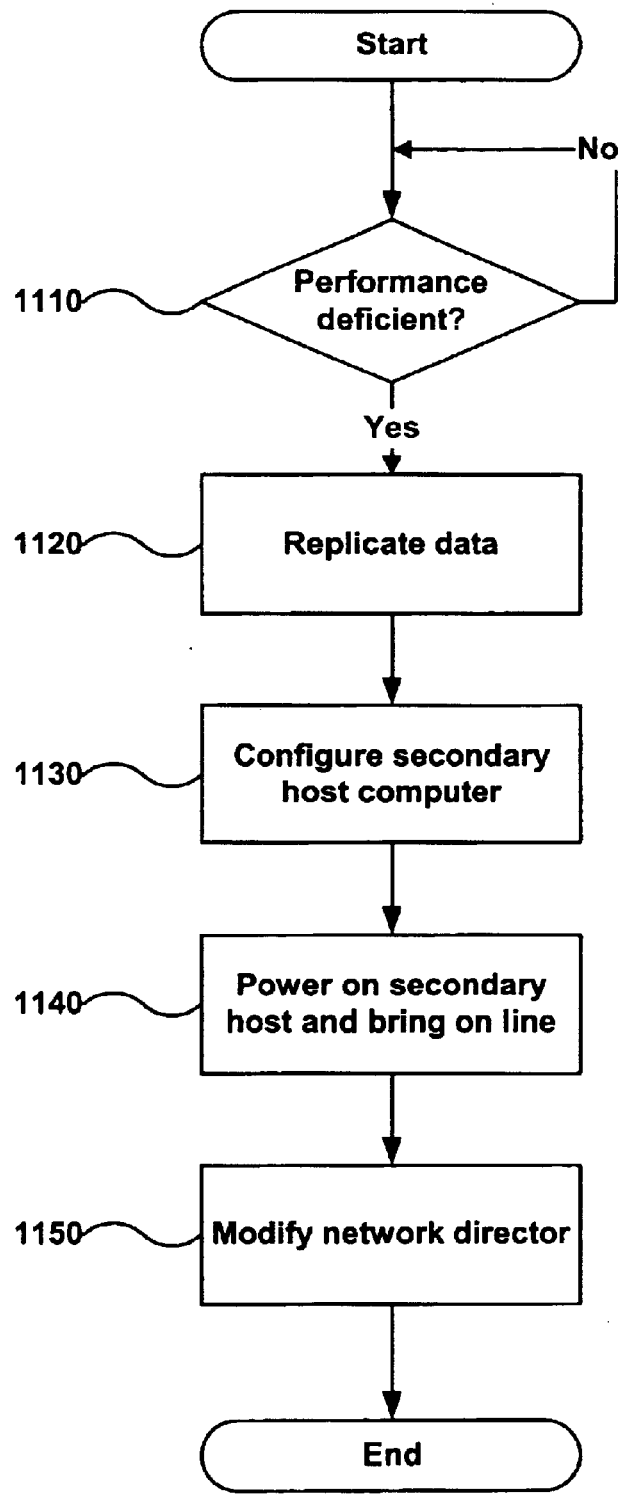
FIG. 11 is a flow diagram of a load balancing routine that can be performed by the controller of FIG. 1 according to another embodiment of the present invention.

According to another embodiment of the present invention, a dynamic load balancing routine is now described, with respect to FIG. 11, that is capable of detecting a change in the performance in a primary host computer and automatically configuring a secondary host computer to provide additional host resources. Advantageously, this embodiment may be used to provide additional host resources for any of the computer environments described above with respect to FIGS. 1, 3, 5, 7, and 10. However, for purposes of illustration, it is assumed that the primary and secondary host computers 110, 120 are identical to one another and are connected to the same storage system 130 and the same network 140, in a manner similar to that shown in FIG. 1. Further, it is assumed that the networked computer environment includes a network director, similar to network director 515 in FIG. 5, that is coupled to the primary and secondary host computers 110, 120, and the communication network 140; and that the secondary host computer 120 is in a powered off state, prior to configuration.

At step 110, the controller 160 determines whether the performance of the primary host computer 110 is deficient. As noted above, this may be determined in a number of ways, such as by actively querying the primary host computer as to its performance, by using an agent (e.g., agent 162) to monitor and report performance metrics to the controller 160, or by being informed by an agent 162 of the primary host computer 110 that the performance of the primary host computer 10 is deficient. As described above, in one embodiment, the performance of the primary host computer 110 is monitored over time, by the controller 160 or an agent 162 of the primary host computer 110, and when a sustained decrease in performance is observed over time, the performance of the primary host computer 110 is viewed as deficient. When it is determined that the performance of the primary host computer 110 is not deficient, the load balancing routine waits at step 110. Alternatively, when it is determined that the performance of the primary host computer 110 is deficient, the load balancing routine proceeds to step 1120.

At step 1120, the controller 160 replicates all of the data of the primary host computer 10 that is stored on storage system 130 (including the operating system, application programs, and application program data) and copies this data to another storage location that can be accessed by the secondary host computer 120. As in the previously described embodiments directed to site failover, the data of the primary host computer 110 that is replicated at step 1130 may be copied to another storage device of the storage system, or to another storage device on a different storage system (e.g., storage device 135' of storage system 130' in FIG. 3) that is accessible by the secondary host computer 120.

In one embodiment, for performance reasons, when the data that is replicated at step 1120 is replicated to the same storage system as that used by the primary host computer 110, this data is stored in a different storage device that is serviced by a different port adapter (e.g., port adapter 132B in FIG. 1) and different disk adapter than that used to store the data of the primary host computer 110. This helps to ensure that data can be quickly accessed by both the primary and secondary host computers 110, 120, as different storage devices and adapters are involved in the transfers of data for the different host computers. Where the data of the primary host computer 110 that is to be shared with the secondary host computer 120 is mirrored data, the mirror copy of that data may be split off for use by the secondary host computer 120 without requiring any replication of data.

After replicating the data of the primary host computer 110, the routine proceeds to step 1130, wherein the secondary host computer 120 is configured to use the data replicated at step 1120, if such configuration is necessary. For example, where the secondary host computer 120 does not already have an IP or other network address, a node name, a domain name, etc., these configurable parameters are set to an appropriate value to allow access to the secondary host computer 120 and avoid conflict with other host computers. Alternatively, where the secondary host computer 120 already has an IP or other network address, a node name, a domain name, etc, the configurable parameters may be set to their previous value (i.e., those of the secondary host computer 120 prior to reconfiguration). After configuring the secondary host computer 120, the routine proceeds to step 1140, wherein the secondary host computer 120 is powered on and brought on line as an alternative host resource to the primary host computer 110 in a manner similar to that described above with respect to FIGS. 2A–2C, 4, 6, and 8. After bringing the secondary host computer 120 on line as an alternative to the primary host computer 110, the routine proceeds to step 1150.

At step 1150, the controller 160 modifies the network director (e.g., network director 515 in FIG. 5) to redirect communications such as service or connection requests from the primary host computer 110 to the IP or other network address of the secondary host computer 120. For example, the network director 515 may be modified to distribute all new service requests directed to the primary host computer 110 to the secondary host computer 120, or to both the primary host computer 110 and the secondary host computer 120 on an alternating basis, etc. After modifying the network director 515, the load balancing routine terminates.

It should be appreciated that after modification of the network director 515, new users are able to access the secondary host computer 120 as an alternative to the primary host computer 110. Thus, further decreases in performance of the primary host computer 110 due to additional users are alleviated. Moreover, after configuration of the secondary host computer 120, the operation of the primary host computer 110 may be modified to redirect some of the older users of the primary host computer 110 (i.e., those users already being serviced by the primary host computer 110 prior to the configuration of the secondary host computer 120) to the secondary host computer 120 to increase the performance of the primary host computer 110 to an acceptable level.

It should be appreciated that the load balancing routine described above with respect to FIG. 11 is but one example of a load balancing routine, and that many modifications to this routine are possible. For example, it is not required that the secondary host computer 120 be in a powered off state prior to being reconfigured to provide additional resources, as the load balancing routine may be modified to bring the secondary host computer 120 from an on-line state to a powered off state. Moreover, where the application programs and application program data of the primary host computer are capable of execution on the secondary host computer 120 with the operating system of the secondary host computer 120, only the application programs and application program data can be replicated, and the secondary host computer 120 need not be powered off at all. For example, where an application program is capable of execution on each of the operating systems of the primary and secondary host computers 110, 120 without modification, only the application program and the application program data may be replicated at step 1120.

In a manner similar to that described with respect to FIG. 3, the primary and secondary host computers 110, 120 each may be connected to a separate storage system (e.g., storage systems 130 and 130' in FIG. 3), and the data of the primary host computer 110 replicated from one storage system to another. Moreover, in a manner similar to that described with respect to FIG. 5, the primary and secondary host computers 110, 120 may be connected to different networks (e.g., networks 140 and 140' in FIG. 5), and in a manner similar to that described with respect to FIGS. 8–9, the primary and secondary host computers 110, 120 need not be identical. In this regard, the load balancing routine of FIG. 11 may be modified in a manner similar to that described above with respect to the site failover routines of FIGS. 2A, 2B, 4, 6, and 8–9 to account for such variations.

As will be appreciated by those skilled in the art, the replication of data for use by the secondary host computer 120, and the subsequent use of that replicated data, makes it possible that, over time, the data used by the secondary host computer 120 will no longer be identical to that used by the primary host computer 110. Where it is important that the data used by the primary host computer 110 and the replicated data used by the secondary host computer 120 be identical, a synchronization mechanism may be provided to ensure that the data used by the primary host computer 110 and the secondary host computer 120 is the same. Such synchronization mechanisms may be storage based (i.e., implemented by the storage processor (e.g., storage processor 133 in FIG. 1) of the storage system 130), or host based (i.e., implemented on the primary and secondary host computers 110, 120).

Alternatively, there are many applications in which there is no need for data synchronization because the data that is accessed either doesn't change over time, is accessed only in a read mode, or both. In these applications, dynamic load balancing may be used to provide additional host resources and share the same data among different host computers without any need for data synchronization. One example of an application in which dynamic load balancing may be used to provide additional host resources without requiring any data synchronization is an on-line help server. In most help applications, the information that is provided to users requesting help changes only infrequently, typically when new versions of software are introduced. Because the help data that is provided to users is essentially static, this data may be shared among different host computers without any need for synchronization. In this regard, dynamic load balancing may be used to configure one or more additional host computers with the same information as a primary host computer, and then modify the primary host computer to direct all help requests to the additional host computer(s) to reduce the load on the primary host computer.

Another example of an application in which dynamic load balancing may be used to provide additional host resources without requiring data synchronization is electronic commerce. In electronic commerce applications, users connect or log into an electronic commerce site, such as a web site or an auction site, that is provided by a host computer. In most electronic commerce applications, the data that is most frequently accessed, such as product descriptions, prices, etc. is that which changes only infrequently and is typically accessed in a read mode, called browsing.

However, as known to those skilled in the art, a problem that exists with many electronic commerce sites is that their usage changes dramatically at different times of the day, and at different times of the year. For example, the number of users that can be expected to visit a web site of a toy store may be expected to be higher during evening hours (e.g., 5:00 p.m. to 10:00 p.m.) than during other hours of the day (e.g., 10:00 p.m. to 5:00 p.m.). Furthermore, the number of users that can be expected to visit that same web site can be expected to increase dramatically during the Christmas holiday season (e.g., from after Thanksgiving to Christmas day). If the web site of the toy store is designed to handle the number of users that can be expected at the busiest times of the day and year, then that web site will be greatly under-utilized at other times of the day and year. This is a great waste of computing resources. Alternatively, if the web site of the toy store is designed to handle the number of users that can be expected at other times of the day and year, then that web site will be greatly over-utilized at the busiest times. During these busier times, accessing information from that web site may be intolerably slow, and users may go elsewhere.

Advantageously, embodiments of the present invention may be used to dynamically configure and provide additional host resources for an electronic commerce site during periods of heavy usage, and then dynamically remove the additional host resources thereafter. Moreover, embodiments of the present invention may also be used to support a number of different electronic commerce sites and dynamically provide each with additional host resources during periods of heavy usage, while minimizing the collective amount of host resources provided. For example, by pooling the needs of different electronic commerce sites having different periods of heavy usage, embodiments of the present invention can provide virtually unlimited host resources for each electronic commerce site, while minimizing the collective amount of host resources that are provided. These aspects of the present invention are now described with respect to FIGS. 12–13.

Figure 12:
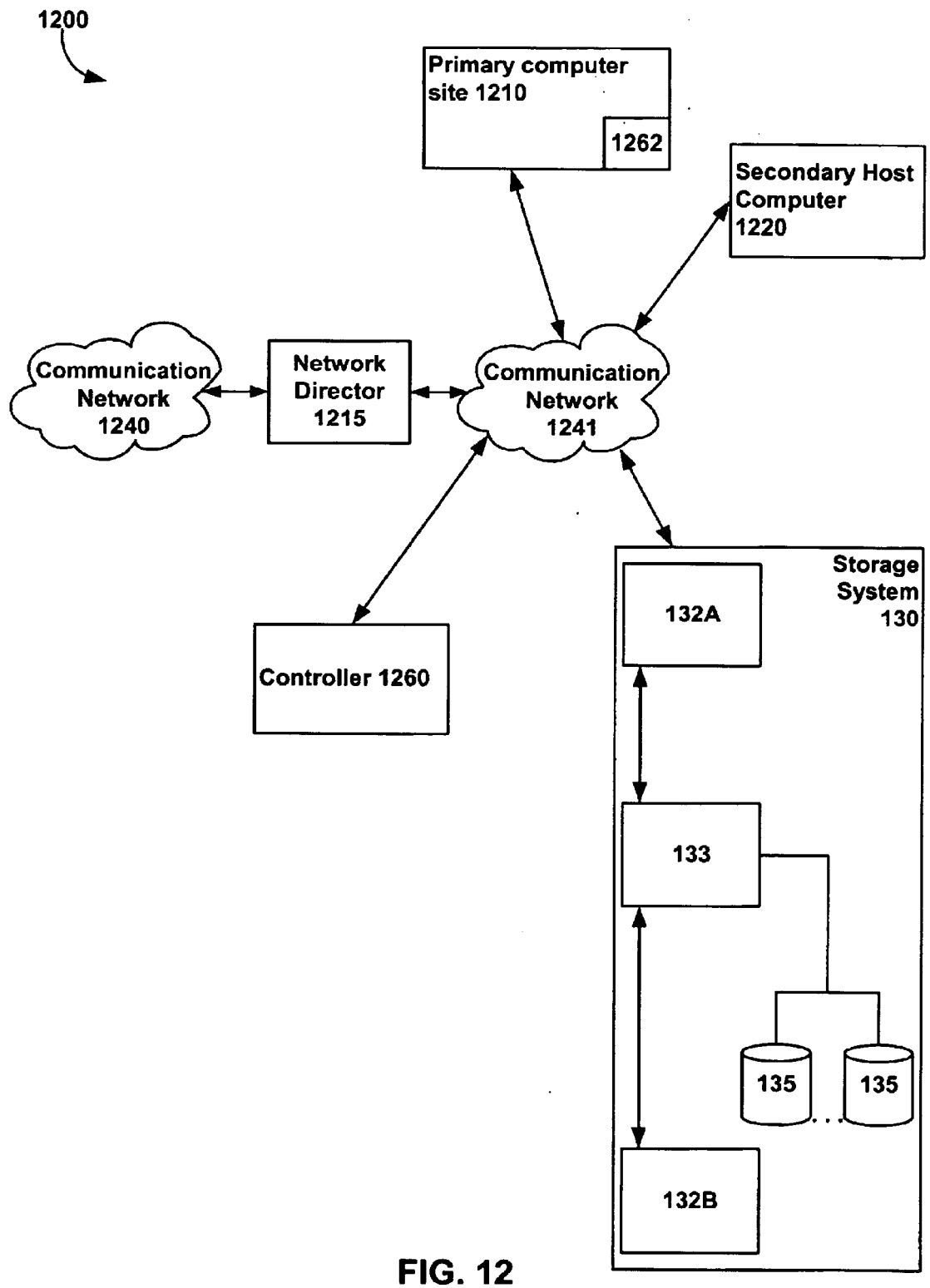
FIG. 12 illustrates a networked computer environment that includes an electronic commerce site and a controller that is capable of providing additional host resources according to an embodiment of the present invention.

As shown in FIG. 12, computer environment 1200 includes a primary computer site 1210 that supports an electronic commerce site, such as a web site, an auction site, etc. The primary computer site 1210 may include one or a plurality of host computers and is coupled to a storage system 130 and a secondary host computer 1220 by a network 1241. The networked computer environment 1200 also includes a network director 1215 that is coupled to network 1241 and to another network 1240, such as the internet. The network director 1215 is used to route service requests from network 1240 to the one or more of the host computers of the primary computer site 1210 that support the electronic commerce site. As users connect or log into the electronic commerce site, the network director 1215 examines the connection request and routes the connection request to one of the host computers of the primary computer site 1210 that is capable of servicing the request. In larger electronic commerce sites where the primary host computer site 1210 includes a number of host computers, the network director 1215 may forward connection requests to individual host computers on a round robin basis in an effort to balance usage. As known to those skilled in the art, network director 1215 may be implemented in a combination of hardware and software on a host computer of the primary computer site 1210, or alternatively, in a combination of hardware and software on a dedicated processor that is coupled to the primary host computer site 1210. As the operation of the network director 1215 is well understood in the art (a wide variety of network directors are commercially available from Cisco, Arrowpoint, and others), and the invention is not limited to using any particular network director, further details of the network director 1215 are omitted herein.

As shown in FIG. 12, networked computing environment 1200 also includes a controller 1260 that is coupled to the network 1241, and thus to the primary computer site 1210, the secondary host computer 1220, the storage system 130 and the network director 1215. In one embodiment, controller 1260 monitors the performance of the primary computer site 1210, and when a decrease in the performance of the primary computer site 1210 is detected, the controller 1260 automatically configures the secondary host computer 1220 to provide additional resources. In one embodiment, the controller 1260 monitors the performance of the primary computer site 1210 over time, and only those decreases in performance that are of a sustained duration result in the configuration of additional host resources. As in previous embodiments of the present invention, controller 1260 may be implemented in software on a storage processor 133 of the storage system 130, or alternatively, may be implemented separately therefrom.

In an alternative embodiment, an agent 1262 is provided for the primary computer site 1210 that executes on a processor of the primary computer site 1210 and communicates with the controller 1260. The agent 1262 monitors the performance of the primary computer site 1210, and when a decrease in the performance of the primary computer site 1210 is detected, reports this information to the controller 1260. In one embodiment, only those decrease in performance that are of a sustained duration are reported to the controller 1260. Upon receiving a report that the performance of the primary computer site 1210 is deficient, the controller 1260 configures the secondary host computer 1220 to provide additional resources.

Figure 13:
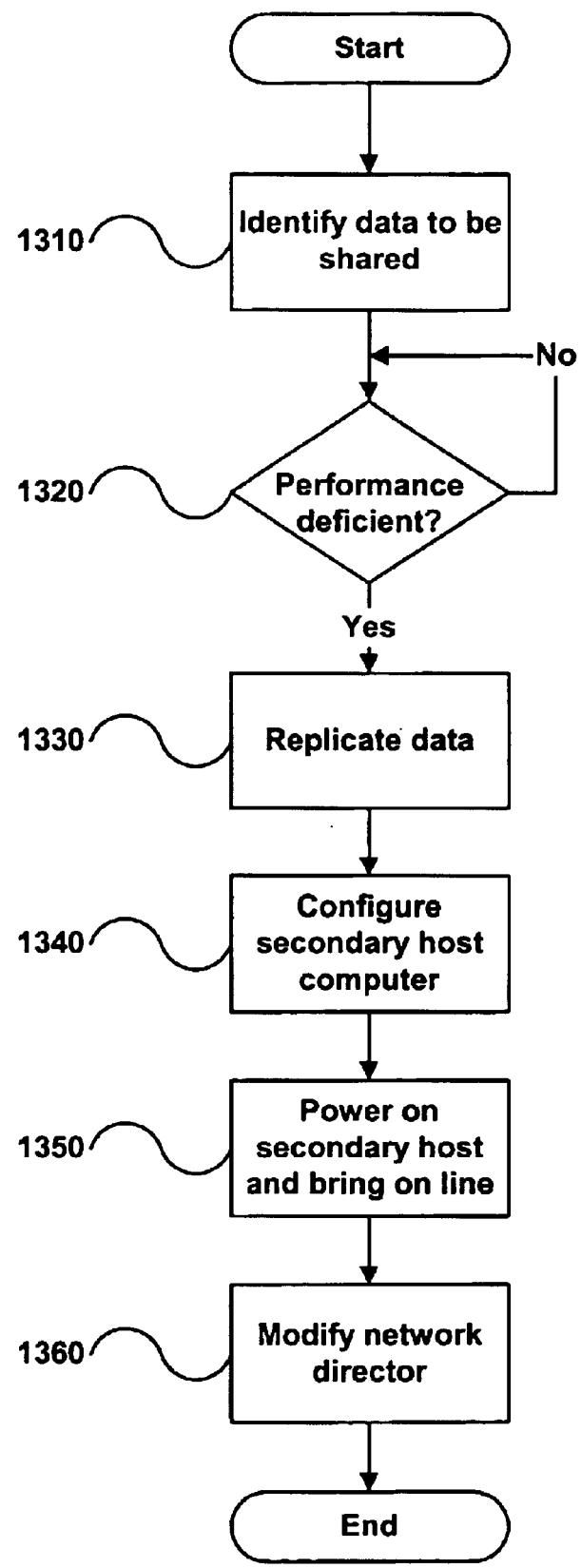
FIG. 13 is a flow diagram of a load balancing routine that can be used to provide additional host resources for an electronic commerce site.

An exemplary flow diagram illustrating one implementation of a load balancing routine that may be performed by the controller 1260 of FIG. 12 is now described with respect to FIG. 13. For purposes of illustration, it is assumed that the primary computer site 1210 includes only a single host computer which is identical to secondary host computer 1220 and located in the same network 1241. It is also assume that the secondary host computer 1220 is initially in a powered off state, and is coupled to a power source by a relay (not shown) that can communicate with the controller 1260. The relay may be similar to that described above with respect to FIGS. 1, 3, 5, and 7. However, it should be appreciated that the present invention is not limited in this regard, as other configurations may alternatively be used, as described further below.

At step 1310, the controller 1260 identifies data of the primary computer site 1210 that is stored on storage system 130 and which can be shared with one or more additional host computers. The data that is identified as shareable includes only that data of the primary computer site 1210 that may be read and/or executed, but not modified (i.e., written, edited, or deleted). Examples of data that may be read and/or executed includes web pages describing products or product pricing, web pages describing the organization hosting the electronic commerce site, web pages describing job openings, store locations, store hours, etc. After identifying data which may be shared with additional host computers, the load balancing routine proceeds to step 1320.

At step 1320, the controller 1260 determines whether the performance of the primary computer site 1210 is deficient. As noted above, this may be determined in a number of ways, such as by actively querying the primary computer site 1210 as to its performance, by using an agent 1262 to monitor and report performance metrics to the controller 1260, or by being informed by the agent 1262 that the performance of the primary computer site 1210 is deficient.

In one embodiment, the number of connection requests over time is monitored to assess performance. For example, when the controller 1260 or agent 1262 determines that the number of connection requests over a predetermined period of time (e.g., one second) is above a predetermined percentage (e.g., 80%) of the primary computer site's capacity for a sustained period of time (e.g., ten minutes), the performance of the primary computer site 1210 is viewed as deficient. Alternatively, when the controller 1260 or agent 1262 determines that the number of connection requests over the predetermined period of time is be low the predetermined percentage, the performance of the primary computer site 1210 is viewed as sufficient. The sufficiency of the performance of the primary computer site 1210 may be determined in a variety of different ways, and in one embodiment, any decrease in performance detected in step 1320 is of a sustained duration. When it is determined that the performance of the primary computer site 1210 is not deficient, the load balancing routine waits at step 1320. When the performance of the primary computer site 1210 is determined to be deficient, the load balancing routine proceeds to step 1330.

At step 1330, the controller replicates the data of the primary computer site 1210 that is stored on storage system 130 (including the operating system, any application programs and application program data), as well as the data that was identified in step 1310, and copies this data to another storage location that is accessible to the secondary host computer 1220. As in the previously described embodiment of FIG. 11, the data of the primary computer site 1210 that is replicated at step 1330 may be copied to another storage device of the storage system 130, or to another storage device on a different storage system. As noted with respect to the previously described embodiment of FIG. 11, for performance reasons, when the data that is replicated at step 1330 is replicated to the same storage system as that used by the primary computer site 1210, this data may be stored in a different storage device (e.g., storage device 135) that is serviced by a different port adapter (e.g., port adapter 132B) and different disk adapter than that used to store the data of the primary computer site 1210. It should further be appreciated that where the data of the primary computer site 1210 that is to be shared with the secondary host computer 1220 is mirrored data, the mirror copy of that data may be split off for use by the secondary host computer 1220 without requiring any replication of data.

After replicating the data of the primary computer site 1210, the load balancing routine proceeds to step 1340, wherein the routine configures the secondary host computer 1220 to use the data replicated at step 1330, if such configuration is necessary. For example, where the secondary host computer 1220 does not already have an IP or other network address, a node name, a domain name, etc., these configurable parameters are set to an appropriate value to allow access to the secondary host computer 1220 and avoid conflict with other host computers. Alternatively, where the secondary host computer 1220 already has an IP or other network address, a node name, a domain name, etc, these values for the configurable parameters may be used. After configuring the secondary host computer 1220, the routine proceeds to step 1350, wherein the controller 1260 powers on the secondary host computer 1220 and brings the secondary host computer 1220 on line to complement the primary computer site 1210. After bringing the secondary host computer 1220 on line, the routine proceeds to step 1360.

At step 1360, the controller 1260 modifies the network director 1215 to route at least some new connection requests to the secondary host computer 1220. To maintain data integrity, the controller 1260 modifies the network director 1215 to route only those new connection requests that solicit information from the electronic commerce site that was identified as sharable at step 1310, and not those that modify information. This modification can be performed in a well known manner based upon the contents of the connection request itself. Any new connection requests that solicit information not identified as shareable (i.e., information used by the electronic commerce site that may differ, during the period of load balancing, between the primary computer site 1210 and the secondary host computer 1220) or that modify information on the electronic commerce site, such as placing orders, bidding on a product, etc, are left undisturbed, and thus, will continue to be routed only to the primary computer site 1210. However, because the vast majority of connection requests to an electronic commerce site are those that solicit information which does not change over time, and do not modify information, the ability to forward those new connection requests to the secondary host computer 1220 will, over time, significantly reduce the load on the primary computer site 1210. In one embodiment, the network director 1215 is modified to forward every other new connection request that solicits information from the primary computer site 1210 to the secondary host computer 1220, in a round-robin approach. However, it should be appreciated that, depending upon the processing capabilities of the secondary host computer 1220, other techniques may be employed to balance the load between the primary computer site 1210 and the secondary host computer 1220. For example, the network director 1215 may be modified to forward all new connection requests that solicit information to the secondary host computer 1220, or every two out of three such new connection requests, etc. After modifying the network director 1215, the load balancing routine terminates.

After modification of the network director 1215, at least some of the new connection requests that solicit information from the primary computer site 1210 are automatically redirected to the secondary host computer 1220. Those new connection requests that solicit information that may change during the period of load balancing or that modify information on the primary computer site 1210 are not affected and continue to be serviced by the primary computer site 1210. For example, any connection requests that make purchases, affect inventory, etc., are serviced by the primary computer site 1210, and are not permitted to be serviced by the secondary host computer 1220. As users that were connected to the primary computer site 1210 log out, and as new connection requests are distributed among the primary computer site 1210 and the secondary host computer 1220, the performance of the electronic commerce site increases.

It should be appreciated that after the secondary host computer 1220 has been configured and brought on line to share in the load of the primary computer site 1210, the controller 1260, or agent 1262, may continue to monitor performance of the primary computer site 1210. For example, if the performance of the primary computer site 1210 again decreases over a sustained period of time, other host computers may be additionally configured. Alternatively, if the performance of the primary computer site 1210 increases by a certain amount at some point after the secondary host computer 1220 is configured, the controller 1260 or agent can determine that the secondary host computer 1220 is no longer needed. For example, the controller 1260 or agent 1262 can continue to monitor the performance of the primary computer site 1210, and when the number of connection requests over a period of time (e.g., one second) is below a predetermined percentage (e.g., 20%) of the primary host computer site's capacity for a sustained duration (e.g., 20 minutes), the controller 1260 can reconfigure the network director 1215 to forward all new connection requests only to the primary computer site 1210. After any connection requests open on the secondary host computer 1220 have been serviced, the secondary host computer 1220 can be brought off-line, or left alone in a pre-configured state for the next time the performance of the primary computer site 1210 decreases. Alternatively, the secondary host computer may be reconfigured to provide additional host resources for another host computer site.

It should be appreciated that the implementation of the load balancing routine described above with respect to FIG. 13 is but one example, and that many modifications to this routine are possible. For example, it is not required that the secondary host computer 1220 be in a powered off state prior to be reconfigured to provide additional resources, as the load balancing routine may be modified to bring the secondary host computer 1220 from an on-line state to an off-line state for reconfiguration. Moreover, the primary computer site 1210 and the secondary host computer 1220 each may be connected to separate storage systems, and the data of the primary computer site 1210 replicated from one storage system to another. In addition, the primary computer site 1210 may be connected to a different network than the secondary host computer 1220, and the host computer(s) of the primary computer site 1210 need not be identical to secondary host computer 1220. In this regard, the load balancing routine of FIG. 13 may be modified to address a wide variety of configurations in a manner similar to that of the site failover routines described previously.

It should also be appreciated that in certain computing environments, less than all of the data of the primary host computer may be replicated for use by the secondary host computer. For example, certain application programs, such as those written in HTML5 (Hyper Text Markup Language) for example, are capable of being executed on a wide variety of host computers and operating systems without modification. Where an application program is independent of the host computer and operating system on which it is executed, only the application program and its application program data may be replicated for use by the secondary host computer 1220. This may be facilitated by storing the application program and application program data on a separate storage device from that used by the operating system. Advantageously this data may be replicated for use by the secondary host computer without shutting down or powering off the secondary host computer.

As should be appreciated from the above description, the dynamic load balancing routine of FIG. 13 permits additional host resources to added and removed to support the needs of an electronic commerce site. However, it should be appreciated that embodiments of the present invention also may be used to provide additional host resources for a number of different electronic commerce sites, and is not limited to supporting a single electronic commerce site. For example, consider a networked computer environment that includes a plurality of electronic commerce sites, each having different periods of heavy usage. One electronic commerce site may be web site for a toy store that is typically busiest around the Christmas holiday season, another may be a web site of a fireworks distributor that is typically busiest around the fourth of July, while a third may be a web site of an automobile dealership that is typically busiest around President's day. If each of these electronic commerce sites was configured with sufficient host resources to meet usage requirements during their busiest periods of the year, then a great deal of host resources would be wasted at other times of the year. Alternatively, if each of the electronic commerce sites was configured to meet usage requirements during other times of the year, then each of the electronic commerce sites could potentially lose customers during its busiest time of the year due to inadequate performance.

Embodiments of the present invention may be used to dynamically configure a plurality of electronic commerce sites with additional host resources necessary to meet usage requirements during their busiest periods, while using these additional host resources elsewhere during other times. Indeed, by servicing the needs of different electronic commerce sites, each with varying periods of heavy usage, each electronic commerce site can be provided with additional host resources during periods of heavy usage, while minimizing the collective amount of host resources provided. It should be appreciated that because embodiments of the present invention may be used in a wide variety of network topologies, there is no requirement that each of the different electronic commerce sites, each of the storage systems involved in the replication of data (where multiple storage systems are involved), or the controller, be present in the same geographic location or located in the same Local Area Network (LAN). Further, only a single controller (e.g., controller 1260) need be used to provide each of the plurality of electronic commerce sites with additional host resources. In addition, where the controller is implemented on a storage processor of a storage system, little additional hardware is required to provide nearly unlimited host resources for each electronic commerce site. It should appreciated that where an electronic commerce site is implemented using an application programming language that is host and operating system independent, one or more host computers can service the demands of a number of electronic commerce sites implemented on a number of different host computer/operating system platforms.

According to a further aspect of the present invention, embodiments of the present invention that are directed to dynamic load balancing may be combined with the previously described embodiments directed to site failover. In this regard, a first controller can be configured to provide site failover, while a second controller can be configured to provide dynamic load balancing. Alternatively, both features may be combined in a single controller that may be implemented by a storage processor of a storage system. As should be appreciated by those skilled in the art, the ability to provide either site failover, load balancing, or both, in a manner that is transparent to a host computer, opens up a number of business opportunities that were not previously possible. For example, rather than a business providing for all of their computer needs in house, the business can purchase a number of inexpensive client processors that connect via a network to the host computers and storage systems of an outside service provider. For example, in FIG. 10, each of the client processors of a first business may connect via network 140 to the primary computer site 1010 of an outside service provider, and each of the client processors of a second business may connect via network 140 to the tertiary computer site 1030 of the outside service provider. Data storage, site failover, and dynamic load balancing for each business may be provided by the outside service provider using secondary computer site 1020, controller 1060, and storage systems 130 and 130' in a manner similar to that described above with respect to FIGS. 1–13. By pooling the requirements of several such businesses, the outside service provider can provide non-interruptible and virtually unlimited host resources for each business. Moreover, each business is spared the expense of having additional host resources to meet their demands, while the outside service provider can share the expense of providing such additional resources over a number of different businesses.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of performing electronic commerce, comprising acts of:

hosting an electronic commerce site on a first host computer;

detecting a change in operation of the electronic commerce site; and automatically configuring a second host computer to host at least a portion of the electronic commerce site on the second host computer in response to the act of detecting;

wherein the act of detecting includes an act of detecting at least one of a failure and a malfunction of the electronic commerce site;

wherein the first host computer is coupled to at least one first storage device that is accessible to the first host computer and in which data of the first host computer is stored; and wherein the act of automatically configuring the second host computer includes an act of:

replicating the data of the first host computer from the at least one first storage device to at least one second storage device that is accessible to the second host computer, wherein the act of replicating the data includes an act of making the data available to the second host computer without the first host computer copying the data from the at least one first storage device and without the second host computer copying the data to the at least one second storage device.

2. The method of claim 1, wherein the act of detecting includes an act of detecting a decrease in performance of the electronic commerce site.

3. The method of claim 2, wherein the first host computer is coupled to at least one first storage device that is accessible to the first host computer and in which data of the first host computer is stored, and wherein the act of automatically configuring the second host computer includes an act of:

replicating the data of the first host computer from the at least one first storage device to at least one second storage device that is accessible to the second host computer.

4. The method of claim 3, wherein the act of automatically configuring further includes an act of:

transforming at least a portion of the replicated data of the first host computer for use with the second host computer when the second host computer is not identical to the first host computer.

5. The method of claim 1, wherein the electronic commerce site is a first electronic commerce site, the method further comprising acts of:

hosting a second electronic commerce site on a third host computer;

detecting a change in operation of the second electronic commerce site; and automatically configuring the second host computer to host at least a portion of the second electronic commerce site on the second host computer in response to the act of detecting.

6. The method of claim 1, wherein the electronic commerce site is a first electronic commerce site, the method further comprising acts of:

hosting a second electronic commerce site on a third host computer;

detecting a change in operation of the second electronic commerce site; and automatically configuring a fourth host computer to host at least a portion of the second electronic commerce site on the fourth host computer in response to the act of detecting.

7. A method of performing electronic commerce, comprising acts of:

hosting an electronic commerce site on a first host computer;

detecting a change in operation of the electronic commerce site; and automatically configuring a second host computer to host at least a portion of the electronic commerce site on the second host computer in response to the act of detecting;

wherein the act of detecting includes an act of detecting at least one of a failure and a malfunction of the electronic commerce site;

wherein the first host computer is coupled to at least one first storage device that is accessible to the first host computer and in which data of the first host computer is stored; and wherein the act of automatically configuring the second host computer includes acts of:

replicating the data of the first host computer from the at least one first storage device to at least one second storage device that is accessible to the second host computer; and modifying a network address of the second host computer to be different than a network address of the first host computer.

8. The method of claim 7, further comprising an act of:

modifying a network director to redirect communications addressed to the network address of the first host computer to the network address of the second host computer.

9. A method of performing electronic commerce, comprising acts of:

hosting an electronic commerce site on a first host computer;

detecting a change in operation of the electronic commerce site; and automatically configuring a second host computer to host at least a portion of the electronic commerce site on the second host computer in response to the act of detecting;

wherein the act of detecting includes an act of detecting a decrease in performance of the electronic commerce site;

wherein the first host computer is coupled to at least one first storage device that is accessible to the first host computer and in which data of the first host computer is stored, and wherein the act of automatically configuring the second host computer includes an act of:

replicating the data of the first host computer from the at least one first storage device to at least one second storage device that is accessible to the second host computer, wherein the act of replicating the data includes an act of making the data available to the second host computer without the first host computer copying the data from the at least one first storage device and without the second host computer copying the data to the at least one second storage device.

10. The method of claim 9, wherein the act of detecting includes an act of detecting at least one of a failure and a malfunction of the electronic commerce site.

11. The method of claim 10, further comprising an act of automatically shutting down the first host computer in response to the act of detecting.

12. The method of claim 10, wherein the first host computer is coupled to at least one first storage device that is accessible to the first host computer and in which data of the first host computer is stored, and wherein the act of automatically configuring the second host computer includes an act of:

replicating the data of the first host computer from the at least one first storage device to at least one second storage device that is accessible to the second host computer.

13. The method of claim 12, wherein the act of automatically configuring the second host computer further includes an act of:

bringing the second host computer on line using the replicated data.

14. The method of claim 12, wherein the act of replicating the data includes an act of replicating the data from the at least one first storage device that is located in a first storage system to the at least one second storage device that is located in a second storage system.

15. The method of claim 12, wherein the act of automatically configuring the second host computer further includes an act of:

transforming at least a portion of the replicated data of the first host computer for use with the second host computer when the second host computer is not identical to the first host computer.

16. A method of performing electronic commerce, comprising acts of:

hosting an electronic commerce site on a first host computer;

detecting a change in operation of the electronic commerce site; and automatically configuring a second host computer to host at least a portion of the electronic commerce site on the second host computer in response to the act of detecting, wherein the act of detecting includes an act of detecting a decrease in performance of the electronic commerce site;

wherein the first host computer is coupled to at least one first storage device that is accessible to the first host computer and in which data of the first host computer is stored, and wherein the act of automatically configuring the second host computer includes an act of:

replicating the data of the first host computer from the at least one first storage device to at least one second storage device that is accessible to the second host computer, wherein the act of replicating the data includes an act of replicating all of the data that is used by the first host computer and stored on the at least one first storage device to the at least one second storage device, and wherein the act of automatically configuring further includes acts of:

modifying a portion of the replicated data that corresponds to configurable parameters of the first host computer; and bringing the second host computer on line using the replicated data and the modified portion of the replicated data.

17. The method of claim 16, wherein the act of modifying the portion of the replicated data includes an act of modifying the portion of the replicated data that corresponds to a network address of the first host computer to correspond to a different network address, the method further comprising an act of:

modifying a network director to redirect at least one communication addressed to the network address of the first host computer to the different network address.

18. The method of claim 16, wherein the act of modifying the portion of the replicated data includes an act of modifying the portion of the replicated data that corresponds to a network address of the first host computer to correspond to a different network address, the method further comprising an act of:

modifying a network director to redirect only communications addressed to the network address of the first host computer that do not modify the replicated data to the different network address.

19. A method of performing electronic commerce, comprising acts of:

hosting an electronic commerce site on a first host computer;

detecting a change in operation of the electronic commerce site; and automatically configuring a second host computer to host at least a portion of the electronic commerce site on the second host computer in response to the act of detecting;

wherein the act of detecting includes an act of detecting a decrease in performance of the electronic commerce site;

wherein the first host computer is coupled to at least one first storage device that is accessible to the first host computer and in which data of the first host computer is stored, and wherein the act of automatically configuring the second host computer includes an act of:

replicating the data of the first host computer from the at least one first storage device to at least one second storage device that is accessible to the second host computer, wherein act of replicating the data includes an act of:

replicating only a portion of the data that is used by the first host computer and stored on the at least one first storage device to the at least one second storage device, the portion of the data corresponding to data of the electronic commerce site that can be used by the second host computer without modification.

20. The method of claim 3, wherein the act of automatically configuring further includes an act of:

bringing the second host computer on line using the replicated portion of the data.

21. The method of claim 20, further comprising an act of:

modifying a network director to redirect at least one communication addressed to a network address of the first host computer to a network address of the second host computer.

22. The method of claim 3, wherein the act of replicating the data includes an act of replicating the data from the at least one first storage device that is located in a first storage system to the at least one second storage device that is located in a second storage system.

23. A method of performing electronic commerce, comprising acts of:

hosting an electronic commerce site on a first host computer;

detecting a change in operation of the electronic commerce site; and automatically configuring a second host computer to host at least a portion of the electronic commerce site on the second host computer in response to the act of detecting;

wherein the act of detecting includes an act of detecting a decrease in performance of the electronic commerce site;

wherein the first host computer is coupled to at least one first storage device that is accessible to the first host computer and in which data of the first host computer is stored; and wherein the act of automatically configuring the second host computer includes acts of:

replicating the data of the first host computer from the at least one first storage device to at least one second storage device that is accessible to the second host computer, wherein the act of replicating the data includes an act of replicating the data from the at least one first storage device that is located in a first storage system to the at least one second storage device that is located in a second storage system; and modifying a network address of the second host computer to be different than a network address of the first host computer.

24. The method of claim 23, further comprising an act of:

modifying a network director to redirect at least one communication addressed to the network address of the first host computer to the network address of the second host computer.

25. A method of performing electronic commerce, comprising acts of:

hosting an electronic commerce site on a first host computer;

detecting a change in operation of the electronic commerce site, wherein the act of detecting includes an act of detecting a decrease in performance of the electronic commerce site;

automatically configuring a second host computer to host at least a portion of the electronic commerce site on the second host computer in response to the act of detecting;

detecting a further decrease in the performance of the electronic commerce site subsequent to the act of automatically configuring the second host computer; and automatically configuring a third host computer to host at least another portion of the electronic commerce site on the third host computer in response to the act of detecting the further decrease in the performance.

26. A computer system, comprising:

a first host computer that hosts an electronic commerce site;

a second host computer; and a controller, operatively coupled to the first host computer and the second host computer, that automatically configures the second host computer to host at least a portion of the electronic commerce site on the second host computer in response to a change in operation of the electronic commerce site, wherein the controller automatically configures the second host computer to host the portion of the electronic commerce site on the second host computer in response to a detection of at least one of a failure, a malfunction, and a change in performance of the electronic commerce site.

27. The computer system of claim 26, further comprising:

a relay that is operatively coupled to a power source, the first host computer, and the controller, the relay switching, in response to an instruction from the controller, between a first position in which power from the power source is provided to the first host computer and a second position in which power from the power source is not provided to the first host computer.

28. The computer system of claim 26, further comprising:

a relay that is operatively coupled to a power source, the second host computer, and the controller, the relay switching, in response to an instruction from the controller, between a first position in which power from the power source is not provided to the second host computer and a second position in which power from the power source is provided to the second host computer.

29. The computer system of claim 26, further comprising:
a storage system that is operatively coupled to the first host computer and the controller, the storage system mirroring data of the first host computer from a first storage device that is accessible to the first host computer to a second storage device that is accessible to the second host computer.

30. The computer system of claim 29, wherein the storage system is a first storage system, the computer system further comprising:
a second storage system that is operatively coupled to the second host computer and the controller;
wherein the first storage device is located in the first storage system and the second storage device is located in the second storage system.

31. The computer system of claim 30, wherein the first host computer is coupled to a first network having a first subnet address and the second host computer is coupled to a second network having a second subnet address that is different than the first subnet address.

32. The computer system of claim 31, wherein the controller includes means for modifying a portion of the mirrored data that corresponds to a network address of the first host computer to correspond to a different address.

33. The computer system of claim 31 further comprising:
a network director, coupled to the first host computer and the controller, that redirects, in response to an instruction from the controller, communications sent to a network address of the first host computer to a network address of the second host computer.

34. The computer system of claim 26, further comprising:
a storage system that is operatively coupled to the first host computer and the controller, the storage system including a first storage device that stores data of the first host computer;
wherein the controller includes means for replicating the data of the first computer from the first storage device to a second storage device that is accessible to the second host computer.

35. The computer system of claim 34, wherein the storage system is a first storage system, the computer system further comprising:
a second storage system that is operatively coupled to the second host computer and the controller;
wherein the first storage device is located in the first storage system and the second storage device is located in the second storage system.

36. The computer system of claim 34, wherein the controller further includes a transformation engine that transforms at least a portion of the replicated data for use by the second host computer.

37. The computer system of claim 26, further comprising:
a storage system that is operatively coupled to the first host computer and the controller, the storage system including a first storage device that stores data of the first host computer;
wherein the controller includes means for replicating a portion of the data of the first computer from the first storage device to a second storage device that is accessible to the second host computer, the portion of data corresponding to the portion of the electronic commerce site.

38. The computer system of claim 26, wherein the controller includes:
means for detecting at least one of a failure, a malfunction, and a change in performance of the electronic commerce site.

39. A computer system, comprising:
a first host computer that hosts an electronic commerce site;
a second host computer;
a controller, operatively coupled to the first host computer and the second host computer, that automatically configures the second host computer to host at least a portion of the electronic commerce site on the second host computer in response to a change in operation of the electronic commerce site;
a first storage system that is operatively coupled to the first host computer and the controller, the first storage system including a first storage device that stores data of the first host computer, wherein the controller includes means for replicating the data of the first computer from the first storage device to a second storage device that is accessible to the second host computer; and
a second storage system that is operatively coupled to the second host computer and the controller, wherein the first storage device is located in the first storage system and the second storage device is located in the second storage system, and
wherein the first host computer is coupled to a first network having a first subnet address and the second host computer is coupled to a second network having a second subnet address that is different than the first subnet address.

40. The computer system of claim 39, wherein the controller includes means for modifying a portion of the replicated data that corresponds to a network address of the first host computer to correspond to a different address.

41. A computer system, comprising:
a first host computer that hosts an electronic commerce site;
a second host computer;
a controller, operatively coupled to the first host computer and the second host computer, that automatically configures the second host computer to host at least a portion of the electronic commerce site on the second host computer in response to a change in operation of the electronic commerce site;
a first storage system that is operatively coupled to the first host computer and the controller, the first storage system including a first storage device that stores data of the first host computer, wherein the controller includes means for replicating the data of the first computer from the first storage device to a second storage device that is accessible to the second host computer;
a second storage system that is operatively coupled to the second host computer and the controller, wherein the first storage device is located in the first storage system and the second storage device is located in the second storage system; and
a network director, coupled to the first host computer and the controller, that redirects, in response to an instruction from the controller, communications sent to a network address of the first host computer to a network address of the second host computer.

42. A computer system, comprising:
- a first host computer that hosts an electronic commerce site;
- a second host computer;
- a controller, operatively coupled to the first host computer and the second host computer, that automatically configures the second host computer to host at least a portion of the electronic commerce site on the second host computer in response to a change in operation of the electronic commerce site; and
- a storage system that is operatively coupled to the first host computer and includes a storage processor;
- wherein the controller executes on the storage processor of the storage system.

43. A storage system for use with a first host computer and a second host computer, the storage system comprising:
- at least one first storage device to store data of the first host computer corresponding to an electronic commerce site hosted by the first host computer;
- a controller that is coupled to the at least one first storage device, wherein the controller, when operatively coupled to the first host computer and the second host computer, automatically configures the second host computer to use at least a portion of the data of the first host computer that corresponds to the electronic commerce site to host a portion of the electronic commerce site on the second host computer in response to a change in operation of the electronic commerce site; and
- wherein the controller executes on the storage processor of the storage system.

44. The storage system of claim 43, wherein the controller includes means for detecting at least one of a failure, a malfunction, and a change in performance of the electronic commerce site.

45. The storage system of claim 43, further comprising:
- at least one second storage device that is coupled to the second host computer and the controller;
- wherein the controller includes means for replicating the portion of the data of the first host computer that corresponds to the electronic commerce site from the at least one first storage device to the at least one second storage device.

46. The storage system of claim 45, wherein the storage system is a networked storage system that includes a first storage system and a second storage system, each coupled to a network, and wherein the at least one first storage device is located in the first storage system and the at least one second storage device is located in the second storage system.

47. A storage system for use with a first host computer and a second host computer, the storage system comprising:
- at least one first storage device to store data of the first host computer corresponding to an electronic commerce site hosted by the first host computer;
- a controller that is coupled to the at least one first storage device, wherein the controller, when operatively coupled to the first host computer and the second host computer, automatically configures the second host computer to use at least a portion of the data of the first host computer that corresponds to the electronic commerce site to host a portion of the electronic commerce site on the second host computer in response to a chance in operation of the electronic commerce site; and
- at least one second storage device that is coupled to the second host computer and the controller;
- wherein the controller includes means for replicating the portion of the data of the first host computer that corresponds to the electronic commerce site from the at least one first storage device to the at least one second storage device, and wherein the means for replicating includes means for replicating the portion of the data of the first host computer that corresponds to the electronic commerce site without either of the first host computer and the second host computer copying the portion of data from the at least one first storage device or to the at least one second storage device.

48. A storage system for use with a first host computer and a second host computer, the storage system comprising:
- at least one first storage device to store data of the first host computer corresponding to an electronic commerce site hosted by the first host computer;
- a controller that is coupled to the at least one first storage device, wherein the controller, when operatively coupled to the first host computer and the second host computer, automatically configures the second host computer to use at least a portion of the data of the first host computer that corresponds to the electronic commerce site to host a portion of the electronic commerce site on the second host computer in response to a change in operation of the electronic commerce site;
- at least one second storage device that is coupled to the second host computer and the controller; and
- a backup storage device that stores a backup copy of the portion of the data of the first host computer that corresponds to the electronic commerce site;
- wherein the controller includes means for replicating the portion of the data of the first host computer that corresponds to the electronic commerce site from the at least one first storage device to the at least one second storage device, wherein the means for replicating includes means for replicating the portion of the data the backup storage device to the at least one second storage device when the portion of the data that is stored on the at least one first storage device is corrupted or unavailable.

* * * * *